(12) United States Patent
Okuno et al.

(10) Patent No.: US 6,315,731 B1
(45) Date of Patent: Nov. 13, 2001

(54) ULTRASONIC DIAGNOSTIC APPARATUS CAPABLE OF FUNCTIONAL ADDITION

(75) Inventors: Yoshiyuki Okuno, Fussa; Masahiko Gondoh, Yamanashi, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/532,939

(22) Filed: Mar. 22, 2000

(30) Foreign Application Priority Data

Mar. 31, 1999 (JP) .................................. 11-093212
Dec. 22, 1999 (JP) .................................. 11-365367

(51) Int. Cl.⁷ ..................................................... A61B 8/00
(52) U.S. Cl. ......................................... 600/459; 600/447
(58) Field of Search ..................... 600/437, 447, 600/448, 449, 455

(56) References Cited

U.S. PATENT DOCUMENTS

| 5,787,889 | 8/1998 | Edwards et al. | |
|---|---|---|---|
| 5,795,297 | 9/1998 | Daigle . | |
| 5,817,024 | * 10/1998 | Ogle et al. | 600/447 |
| 5,851,186 | * 12/1998 | Wood et al. | 600/437 |
| 6,135,961 | * 10/2000 | Pflugrath et al. | 600/447 |

FOREIGN PATENT DOCUMENTS

| 3719143 | 12/1988 | (DE) . |
|---|---|---|
| 0140539 | 5/1985 | (EP) . |
| 0612502 | 8/1994 | (EP) . |

OTHER PUBLICATIONS

Patents Abstracts of Japan —Vol. 1995, No. 11, Dec. 26, 1995 & JP 07 213521 A (Hitachi Medical Corp), Aug. 15, 1995.

* cited by examiner

Primary Examiner—Marvin M. Lateef
Assistant Examiner—Maulin Patel
(74) Attorney, Agent, or Firm—Ostrolenk, Faber, Gerb & Soffen, LLP

(57) ABSTRACT

An ultrasonic diagnostic apparatus of a mechanical scanning system has: a receiving/transmitting unit for receiving and transmitting an ultrasonic wave from/to an ultrasonic vibrator; and a PC. The PC has: a PC board mounted detachably, which controls a motor driving circuit via the receiving/transmitting unit, rotates the ultrasonic vibrator that is mounted to the rotary shaft of a motor to become the center of the rotation by rotating the motor in response to a motor drive signal, controls the receiving/transmitting unit, and performs a predetermined digital signal process for an ultrasonic echo signal from the receiving/transmitting unit; a PC internal memory for storing a digital signal from the PC board; a general CPU; and the like.

10 Claims, 19 Drawing Sheets

| ADDRESS | REGISTER NAME |
|---|---|
| 0 | NUMBER OF DATA WRITING TIMES |
| 1 | DATA WRITE INTERVAL |
| : | : |

"pmaddwd mm1, mm2"

| mm1 | L1 | L2 | L1 | L2 |
|---|---|---|---|---|
| | × | × | × | × |
| mm2 | S11 | S10 | S01 | S00 |

※ L1 = a / (a + b)
L2 = b / (a + b)

| mm1 | S11·L1+S10·L2 | S01·L1+S00·L2 |
|---|---|---|

ULTRASONIC DIAGNOSTIC APPARATUS CAPABLE OF FUNCTIONAL ADDITION

BACKGROUND OF THE INVENTION

1. Field of the Invention

The present invention relates to an ultrasonic diagnostic apparatus for obtaining a biogenic tomogram by irradiating an ultrasonic pulse in vivo and receiving a reflecting wave which is reflected from a biogenic tissue.

2. Description of the Related Art

Hitherto, there has been put into practical use an ultrasonic diagnostic apparatus for obtaining a biogenic tomogram by irradiating an ultrasonic pulse in vivo and receiving a reflecting wave which is reflected from a biogenic tissue. Since the ultrasonic diagnostic apparatus can noninvasively diagnose the internal part of the biological material and thus has high safety therefor, this is an indispensable apparatus for a clinical medicine and is widely spread. In particular, the ultrasonic endoscope is used for diagnosing a case which can not be decided by a surface of the biological material and which needs to insert the ultrasonic diagnostic apparatus into the celom. This has increased the demand for the ultrasonic diagnostic apparatus.

FIG. 20 is a block diagram showing a constructional example of a conventional ultrasonic diagnostic apparatus of a mechanical scanning system.

As shown in FIG. 20, the ultrasonic diagnostic apparatus of the mechanical scanning system is provided with a controller 22 that a CPU 23 as control means controls. A motor driving circuit 3 is controlled in response to a timing signal of the controller 22, and a motor drive signal from the motor driving signal 3 causes the rotation of a motor 4 and a vibrator 5 which is mounted to a rotating shaft of the motor 4 at a center of the rotation.

The vibrator 5 supplies, to the controller 22, via a position detecting circuit 71 a synchronous signal outputted from the position detecting circuit 71 by the rotation of the vibrator 5, and which is synchronized with the timing signal, thereby emitting an ultrasonic pulse. A transmission signal generator 1 oscillates a transmission signal as a reference under the control operation of the controller 22. A transmitting amplifier 2 thereafter amplifies the oscillation signal to a necessary level. After that, the amplified signal is supplied to the vibrator 5, thereby emitting the ultrasonic pulse, for example, to the internal part of the biological material.

The vibrator 5 receives a reflecting wave which is reflected from the biogenic tissue. A receiving amplifier 6 and a band pass filter (labeled as a BPS in the figure) 7 remove an unnecessary signal component from the received signal. After a detecting circuit 8 detects the signal, the detected signal is amplified to a predetermined size by a GAIN/STC 9 as a variable amplifier capable of varying an amplification factor.

A reception signal outputted from the GAIN/STC 9 passes through a low pass filter (labeled as an LPF in the figure) 12, an A/D converter 13 converts the reception signal into a digital signal, and it is stored into a FIFO 14. The data stored in the FIFO 14 is coordinatetransformed by an address control 16 and a look-up table (LUT) 17 for coordinate transformation, and stored into a predetermined position in a memory 15.

The above operation is controlled by the controller 22 at a predetermined periodic interval until one rotation by the vibrator 5 ends. After storing the reception data of one rotation to the memory 15, the stored data is read out of the memory 15 by the reading-out operation of the address controller 16 and the read-out data is supplied to an interpolating circuit 18. In the interpolating circuit 18, an LUT 19 for interpolating process executes an interpolating process, and a video processing circuit 20 performs a process necessary for display after that. The processed signal is thereafter supplied to a monitor 21, thereby displaying a radial image based on the reception data.

FIG. 21 is a block diagram showing a constructional example of a conventional ultrasonic diagnostic apparatus of a mechanical scanning system in case of adding a linear display function to the ultrasonic diagnostic apparatus shown in FIG. 20.

In FIG. 21, the motor driving circuit 3 is controlled in response to the timing signal of the controller 22 and the vibrator 5 is rotated. Synchronously with the timing signal of the controller 22, the vibrator 5 receives and transmits an ultrasonic wave.

Only a predetermined signal is amplified and taken out of the reception signal by the receiving amplifier 6, BPF 7, detecting circuit 8, and GAIN/STC 9. The A/D converter 13 converts the taken-out signal to a digital signal and stored into the FIFO 14. The stores it data is coordinate-transformed by the address controller 16 and LUT 17 for coordinate transformation and stored to a predetermined position in the memory 15. The aforementioned operation is the same as that of the apparatus shown in FIG. 20, and conducted at a predetermined periodic interval until the end of one rotation of the vibrator 5.

After storing the reception data of one rotation to the memory 15, the stored data is read out of the memory 15 by the reading-out operation of the address controller 16 and the read-out data is supplied to the interpolating circuit 18. In the interpolating circuit 18, the LUT 19 for interpolating process executes the interpolating process for the supplied data, and the interpolated data is thereafter stored into a radial image memory 25a and a linear image memory 25b of an image memory 25 which is newly provided, based on a writing control by an image output controller 24. In this case, there is stored to the radial image memory 25a the same data as the data outputted to the video processing circuit 20 shown in FIG. 20. Additionally, there is stored to the linear image memory 25b data which corresponds to a tomogram of one frame formed by coupling data at an arbitrary portion that is designated by the radial image which is subjected to the interpolating process as much as a plurality of frames.

The image output controller 24 controls the operation for reading out the data stored to the image memory 25 by the radial image memory 25a and linear image memory 25b, based on an output mode of a selected image. Similarly to the foregoing apparatus, the read-out data is supplied to the video processing circuit 20, thereby performing the process necessary for display for the read-out data. The processed data is thereafter supplied to the monitor 21, which to thereby displays a radial image or a linear image based on the reception data, or an image corresponding to both of them.

Referring to FIGS. 20 and 21, when the rotational period of the vibrator 5 is different depending upon a connected scanner (ultrasonic endoscope), another system in which the address controller 16 is changed corresponds thereto. When connecting a scanner which mechanically drives a vibrator different from that in FIGS. 20 and 21 (such as sector scanning, 3D scanning, and scanning line density variation), another system in which the look-up table 17 for coordinate transformation and address controller 16 are changed corresponds thereto.

However, the FIFO 14, memory 15, address controller 16, and LUT 17 for coordinate transformation are necessary for coordinate-transforming the reception data which the A/D converter 13 converts into digital data by the conventional ultrasonic diagnostic apparatus. The interpolating circuit 18 and LUT 19 for interpolating process are also necessary for executing the interpolating process. Further, the CPU 23 is necessary for controlling the address controller 16 and controller 22. As mentioned above, the dedicated coordinate-transforming circuit and interpolating circuit are necessary, and since the processing circuits are high-speed arithmetic circuits, the circuits are made complicated. Because preparing data referred to in the processing step as the LUT for coordinate transformation and LUT for interpolating process, a dedicated memory for storing the data is made necessary, the circuit scale is increased, and thus costs also become expensive.

When changing the timing to fetch the reception data due to functional addition and changing the control to the receiving/transmitting unit, the exchange and correction of the controller 22 is needed and this causes a problem that the function cannot be added simply.

In order to cut out an arbitrary position of the radial image obtained by the coordinate transformation and interpolating process and generate the linear image by coupling the cut-out images, there are necessitated the linear image memory 25a and image output controller 24 for generating the linear image. The radial image and linear image are combined and displayed and, therefore, there are necessitated the radial image memory 25a and linear image memory 25b as the image memory 25 and the image output controller 24 for controlling the image outputs by the image output modes. Also necessitated are the dedicated processing circuit and the image storing memory which further have to be operated at a high speed, so that the circuit scale is increased and complicated, and costs are also made expensive in this case.

The period and the like of a position signal outputted from the position detecting circuit 71 are made different, depending upon the scan of a connected scanner (such as sector scanning, linear scanning, radial scanning, variation in rotational speed of the vibrator, 3D scanning, and scanning line density variation). Therefore, it is necessary to change the design of the controller 22 and the address controller 16 for controlling the FIFO 14 and memory 15, or provide a memory in the address controller 16 and controller 22 and prepare a parameter for timing change whose number corresponds to the scanning of the connected scanner. As explained above, in order to correspond to the different period and the like by the design change of the controller system including the controller 22 and the address controller 16, a substrate including a controller, etc. is exchanged unavoidably, the costs are made expensive, the connected scanner is restricted, and a function cannot be added. Further, to have a parameter whose number corresponds to the period of the position signal in the controller system, there are made necessary a device for control whose circuit scale is large and an external memory device, and this thus causes a problem that the costs are expensive.

SUMMARY OF THE INVENTION

It is an object of this invention to provide an ultrasonic diagnostic apparatus which has a relatively small size and is inexpensive, capable of adding a function simply.

It is another object of this invention to provide an ultrasonic diagnostic apparatus, capable of adding and executing various display functions with a simple construction and low costs unless utilizing a processing circuit which causes the complication and large costs.

There is provided an ultrasonic diagnostic apparatus comprising: a first connecting unit which is detachable to an ultrasonic receiving/transmitting unit having an ultrasonic vibrator so as to input an ultrasonic reception signal obtained by the ultrasonic receiving/transmitting unit; a driving control unit for generating a control signal to drive the ultrasonic vibrator; a second connecting unit which is detachable to the ultrasonic receiving/transmitting unit so as to output the control signal from the driving control unit to the ultrasonic vibrator of the ultrasonic receiving/transmitting unit; a first storing unit for storing the ultrasonic reception signal inputted from the first connecting unit as ultrasonic data; a second storing unit for storing a coordinate-transforming program to subject the ultrasonic data stored to the first storing unit to a coordinate-transforming process and generate an ultrasonic image; and an arithmetic processing unit for generating ultrasonic image data which is coordinatetransformed from the ultrasonic data stored to the first storing unit by reading out the coordinate-transforming program from the second storing unit and executing the coordinate-transforming program.

Other features and advantages of the present invention will be fully apparent from the following description.

BRIEF DESCRIPTION OF THE DRAWINGS

FIG. 1 is a constructional diagram showing a construction of an ultrasonic diagnostic apparatus of a mechanical scanning system; FIG. 2 is a constructional diagram showing a detailed construction of a timing controller in FIG. 1; FIG. 3 is a constructional diagram showing a specific construction of a memory for reception data in FIG. 1; FIG. 4 is a explanatory diagram for explaining data storage to the memory for reception data in FIG. 3; FIG. 5 is a constructional diagram showing a construction of a main portion of a first modification of the ultrasonic diagnostic apparatus of the mechanical scanning system in FIG. 1; and FIG. 6 is a constructional diagram showing a construction of a main portion of a second modification of the ultrasonic diagnostic apparatus of the mechanical scanning system in FIG. 1, FIGS. 7 to 17 relate to a second embodiment of the present invention.

DESCRIPTION OF THE PREFERRED EMBODIMENTS

An embodiment of the present invention will be now described with reference to the drawings.
First Embodiment
(Constitution)

Figure 1:
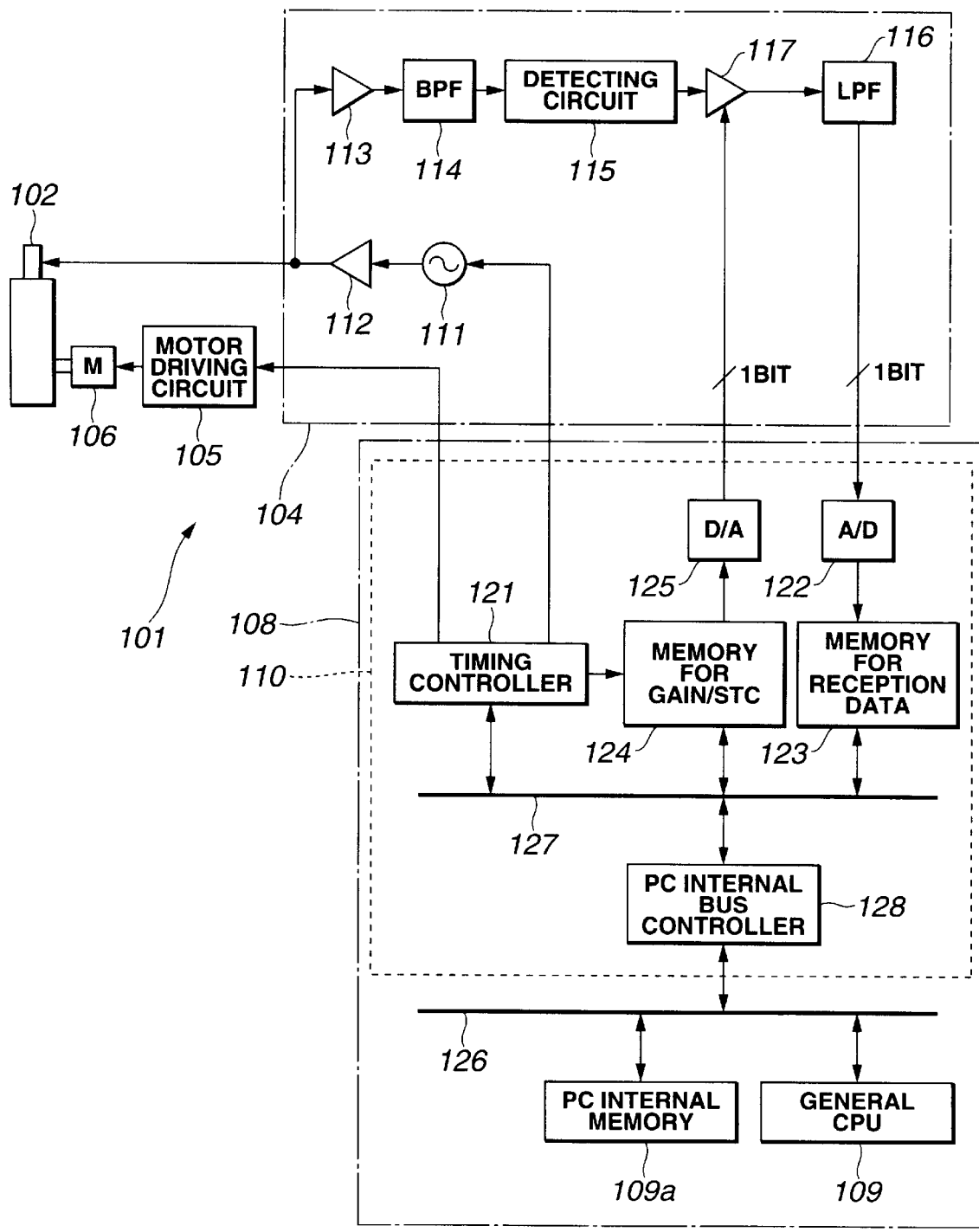
FIGS. 1 to 6 relate to a first embodiment of the present invention.

As shown in FIG. 1, an ultrasonic diagnostic apparatus 101 of a mechanical scanning system according to the present embodiment comprises: a receiving/transmitting unit 104 for receiving and transmitting an ultrasonic wave from/to an ultrasonic vibrator 102; and a personal computer (referred to as a PC, hereinlater) 110.

The PC 110 comprises: a PC board 108, which is mounted detachably, for controlling a motor driving circuit 105 through the receiving/transmitting unit 104 and rotating a motor 106 in response to a motor drive signal to thereby rotate the ultrasonic vibrator 102 mounted to the rotary shaft of the motor 106 so as to be at the center of rotation thereof, and subjecting an ultrasonic echo signal from the receiving/transmitting unit 104 to a predetermined digital signal process by controlling the receiving/transmitting unit 104; a PC internal memory 109a for storing the digital signal from the PC board 108; a general CPU 109; and the like.

The receiving/transmitting unit 104 comprises: a transmission signal generator 111 and a transmitting amplifier 112 for emitting an ultrasonic pulse in vivo from the ultrasonic vibrator 102; a receiving amplifier 113 and a band pass filter (BPF) 114 for receiving the ultrasonic echo signal of the ultrasonic pulse from the internal part of biological material by the ultrasonic vibrator 102 and removing an unnecessary signal component; a detecting circuit 115 for detecting a reception signal via the receiving amplifier 113 and BPF 114; and a GAIN/STC 117 for amplifying the detected signal to a predetermined size and outputting the amplified signal to the PC board 108 in the PC 110 through a low pass filter (LPF) 116.

The PC board 108 in the PC 110 comprises: a timing controller 121 for controlling the motor driving circuit 105 in response to a timing signal; an A/D converter 122 for A/D converting the output of the GAIN/STC 117 via the LPF 116 in the receiving/transmitting unit 104; a memory 123 for reception data for storing the digital data converted by the A/D converter 122; a memory 124 for GAIN/STC for storing the amplification data from the GAIN/STC 117 as digital data, making the amplification data synchronous with the timing signal from the timing controller 121, and outputting the signal; a D/A converter 125 for D/A converting an output of the memory 124 for GAIN/STC, and changing the amplification amount of the GAIN/STC 117 corresponding to the amplification of the analog signal by outputting the converted analog signal to the GAIN/STC 117; and a PC internal bus controller 128 for connecting a PC internal bus 126 to a local bus 127 in the PC board 108, and connecting the PC internal memory 109 to the PC board 108.

It is noted that data of the memory 124 for GAIN/STC can be changed by the PC 110 via the PC internal bus controller 128. The transmission signal generator 111 in the receiving/transmitting unit 104 is controlled in response to the timing signal of the timing controller 121.

Figure 2:
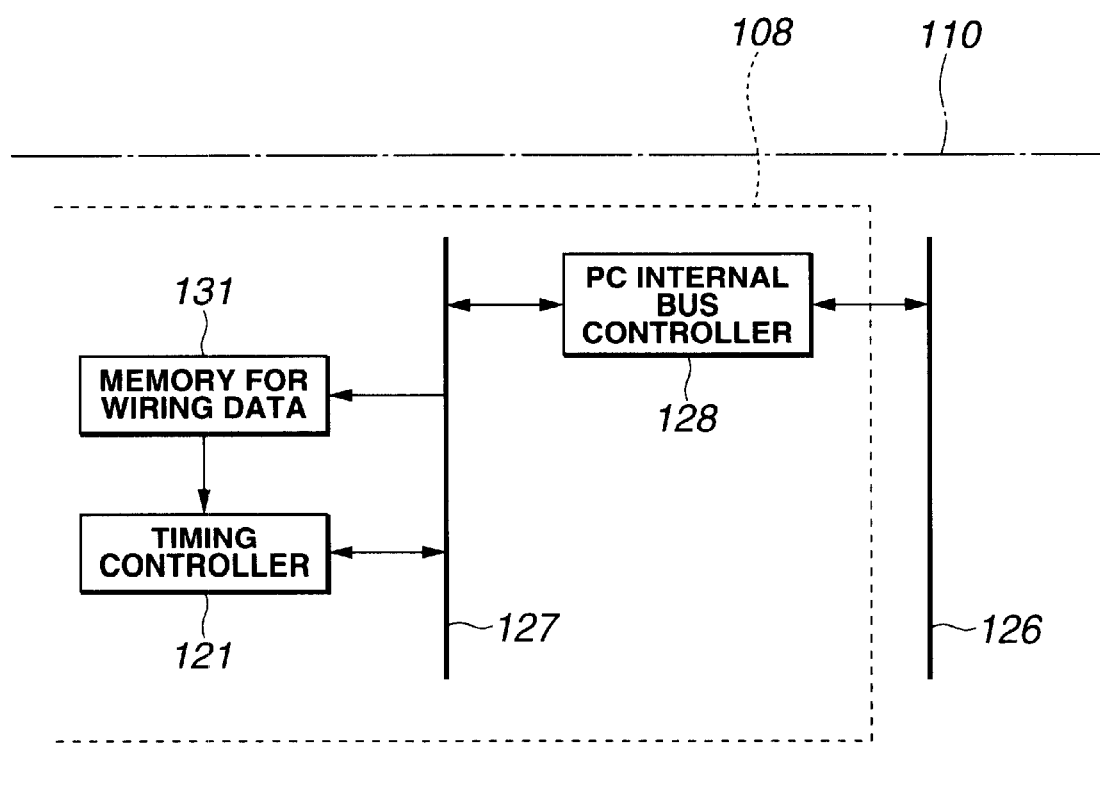

The timing controller 121 comprises, for instance, an FPGA (field programmable gate array). As shown in FIG. 2, the local bus 127 in the PC board 108 is provided with a memory 131 for wiring data for storing wiring data of the timing controller 121.

When instructing an arbitrary command to the timing controller 121 from the PC 110 by way of the PC internal bus 126 and the PC internal bus controller 128 in the PC board 108, there is stored to the memory 131 for wiring data the wiring data of the timing controller 121 which is transferred from the PC 110 via the local bus 127. Upon starting the PC 110 again, the timing controller 121 reads the wiring data from the memory 131 for wiring data, thereby making the specification of the timing controller 121 changeable.

(Operation)

The next description turns to the operation of the above-constructed ultrasonic diagnostic apparatus of the mechanical scanning system according to the present embodiment.

The motor driving circuit 105 is controlled in response to the timing signal of the timing controller 121, and the motor 106 is driven by a motor drive signal from the motor driving circuit 105, thereby rotating the ultrasonic vibrator 102. The ultrasonic vibrator 102 is synchronized with the timing signal of the timing controller 121, the signal is transmitted to the ultrasonic vibrator 102 through the transmission signal generator 111 and the transmitting amplifier 112, and the ultrasonic vibrator 102 transmits an ultrasonic pulse in vivo.

The ultrasonic vibrator 102 receives an ultrasonic echo signal of the ultrasonic pulse from the biological material, and the receiving amplifier 113 amplifies the reception signal to a predetermined size. The BPF 114 removes an unnecessary noise component from the amplified reception signal, and the detecting circuit 115 subjects the signal whose noise component is removed to a detecting process. Based on the amplification data of the digital data stored to the memory 124 for GAIN/STC, the GAIN/STC 117 amplifies the reception signal subjected to the detecting process to a predetermined size, and with time is corrected so as to with. The reception signal from the GAIN/STC 117 passes through the LPF 116, and is outputted from the receiving/transmitting unit 104 to the PC 110.

In particular, since the size of the reception signal which comes back from a deeper part in the biological material has become smaller, it is corrected so as to become bigger by means of the GAIN/STC 117.

The reception signal outputted from the receiving/transmitting unit 104 is inputted to the PC board 108 mounted to the PC internal bus 126 in the PC 110. The reception signal inputted to the PC board 108 is converted into digital data by the A/D converter 122, and stored to the memory 123 for reception data.

Figure 3:
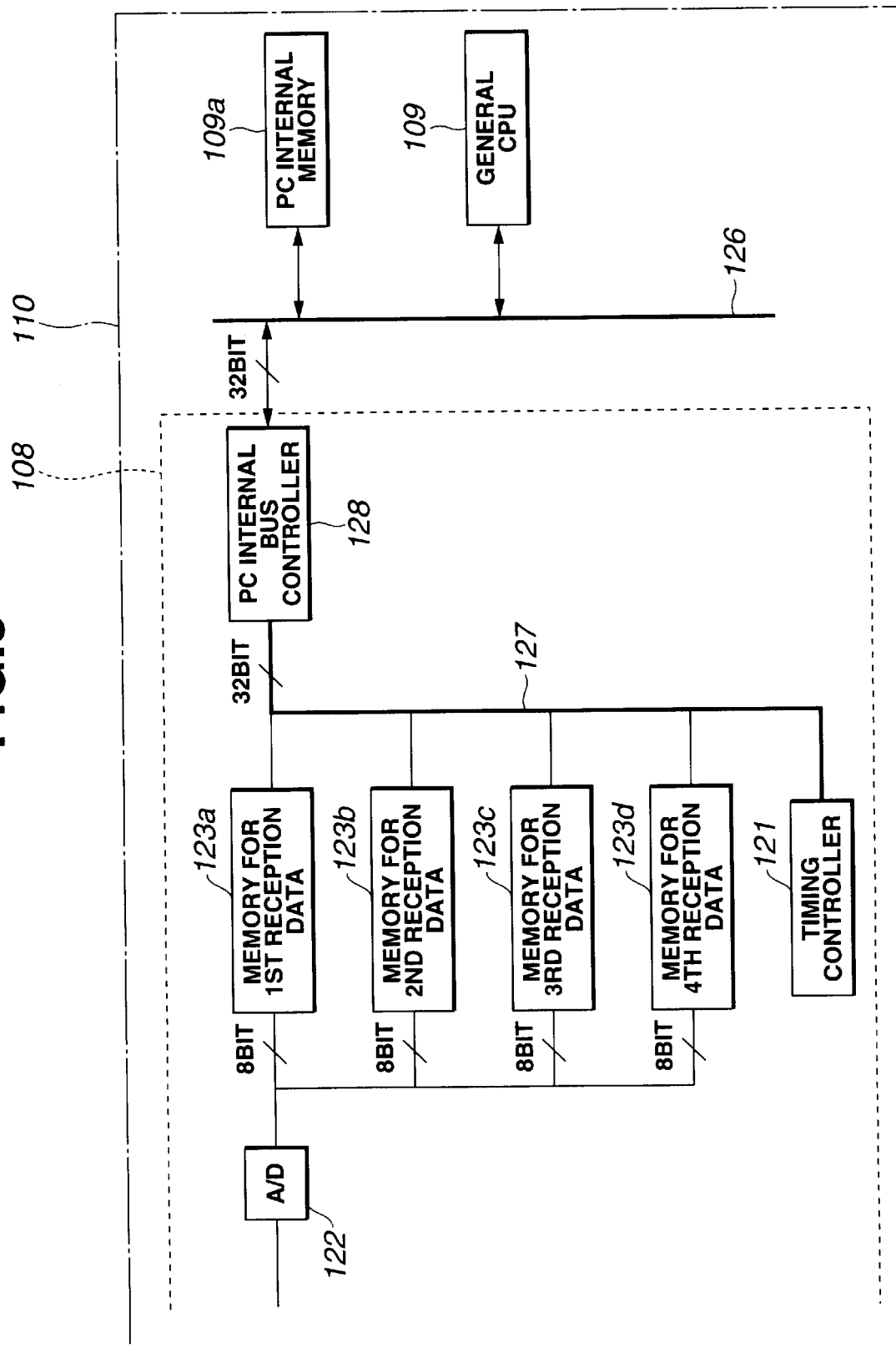

FIG. 3 illustrates a state of storing the reception data to the memory 123 for reception data.

As shown in FIG. 3, in the case where the A/D converter 122 has a resolution of 8 bits, the memory 123 for reception data comprises, for example, four 8-bit memories: a first memory 123a for reception data; a second memory 123b for reception data; a third memory 123c for reception data; and a fourth memory 123d for reception data. Connected in parallel to the output terminal of the A/D converter 122 are the first memory 123a for reception data, second memory 123b for reception data, third memory 123c for reception data, and forth memory 123d for reception data. The data bus width of the PC internal bus 126 is set to 32 bits.

The reception data outputted from the A/D converter 122 is stored into the first memory 123a for reception data, second memory 123b for reception data, third memory 123c for reception data, and forth memory 123d for reception data, switching the first to forth memories 123a to 123d every sample. The reception data is stored in an exemplified manner such that the reception data of an n-th sound ray sample No. 0 is stored into the first memory 123a for reception data; the reception data of a sample No. 1 the second memory 123b for reception data; the reception data of a sample No. 2 the third memory 123c for reception data; the reception data of a sample No. 3 the forth memory 123d for reception data; and the reception data of a sample No. 4 the first memory 123a for reception data again.

Figure 4:
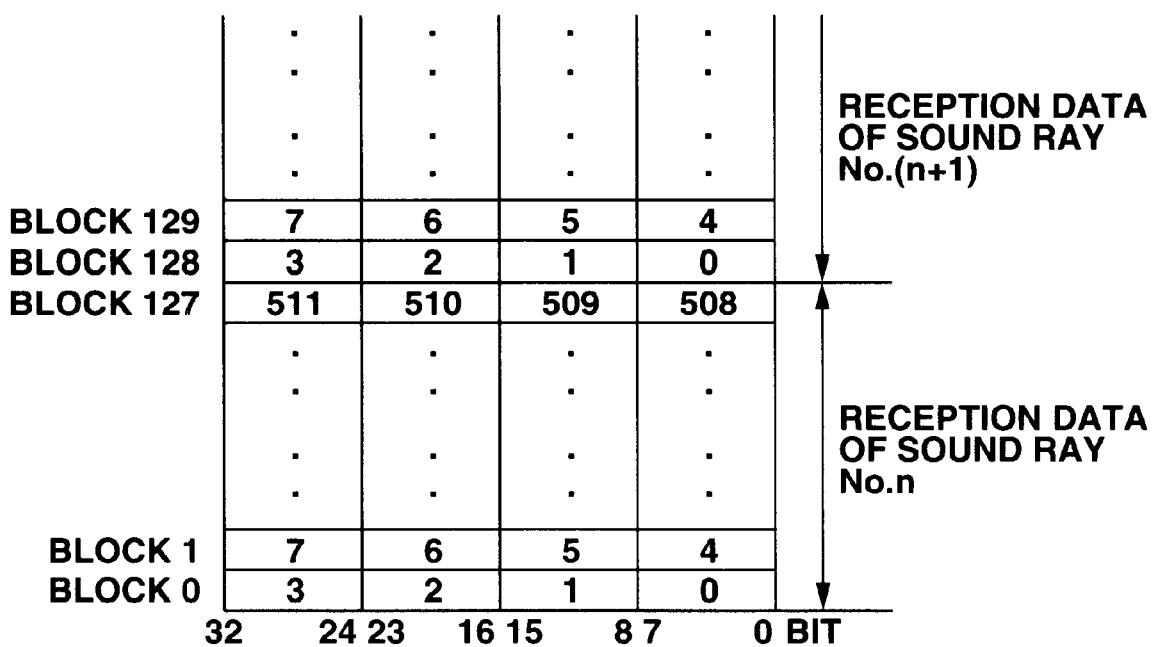

FIG. 4 illustrates a state that according to the above-discussed method, the reception data is stored into the first memory 123a for reception data, second memory 123b for reception data, third memory 123c for reception data, and forth memory 123d for reception data, respectively. FIG. 4 also illustrates a case where the number of samples of the reception data per sound ray is equal to 512.

As shown in FIG. 4, samples 0, 4, . . . , 508 of a sound ray No. n are stored into the first memory 123a for reception data; samples 1, 5, . . . , 509 of the sound ray No. n the second memory 123b for reception data; samples 2, 6, . . . , 510 of the sound ray No. n the third memory 123c for reception data; and samples 3, 7, . . . , 511 of the sound ray No. n the forth memory 123d for reception data. The stored data is transferred to the PC internal bus 126, setting one-array data in the lateral direction to one piece of data. Specifically speaking, a block 0 comprising samples 0 to 3 of the sound ray No. n is set to 32-bit data, and transferred to the PC internal bus 126 in a lump.

That is, the reception data of one frame which is collected as 32-bit data is stored to the memory 123 for reception data, thereafter passes through the PC internal bus controller 128 which is connected to the memory 123 for reception data via the local bus 127 in the PC board 8, and is transferred to the PC 110 by way of the PC internal bus 126.

The coordinate-transforming process and the like are conducted by the PC 110 which inputs the stored reception data of one frame to the memory 123 for reception data via the PC internal bus 126, and the ultrasonic image is displayed to a monitor (not shown).

(Effects)

According to the present embodiment, after storing the reception data of one frame which is collected as 32-bit data to the memory 123 for reception data, the reception data is transferred to the PC 110 through the PC internal bus 126. Therefore, the PC 110 can execute the coordinate-transforming process and the like fully, and it is able to obtain an ultrasonic diagnostic apparatus of a mechanical scanning system whose costs are suppressed without needing to use a dedicated complicated circuit for the coordinate-transforming process, etc.

Reduced is the number of data transferred to the PC internal memory 109 in the PC 110 via the PC internal bus 126 by the PC internal bus controller 128. It is capable of decreasing data transfer time.

Further, by transferring the reception data to the PC 110 once by the use of a DMA (direct memory access) to transfer data, not via the general CPU in the PC 110, it is possible to reduce the data transfer time and decrease the load in the PC 110 upon transferring the data.

When an arbitrary command is instructed to the timing controller 121, there is stored the wiring data of the timing controller 121 which is transferred to the memory 131 for wiring data from the PC 110 through the local bus 127. Upon restarting the PC 110, the timing controller 121 reads the wiring data from the memory 131 for wiring data, thereby enabling the change of the specification of the timing controller 121. As a consequence, it is capable of adding a function simply.

Although the present embodiment is described under the setting such that the data bus width of the PC internal bus 126 is equal to 32 bits, this setting does not restrict the data bus width of the PC internal bus 126. In the case where the data width of the PC internal bus 126 is equal to 64 bits, it is able to further reduce the data transfer time if employing the number of 8-bit memories of the memory 123 for reception data in the PC board 108.

Although the number of quantization bits of the A/D converter 122 is equal to 8 bits, this also does not restrict the number of quantization bits of the A/D converter 122. In the case of the A/D converter of 12 bits, according to the construction in FIG. 3, two 8-bit memories are combined, exemplifying the combination of the first memory 123a and the second memory 123b for reception data and the combination of the third memory 123c and the fourth memory 123d for reception data, and the memory is thus used as a memory for storing one piece of 12-bit data. Therefore, it is capable of shortening transfer time as compared with the case of transferring 12-bit data one by one.

Figure 5:
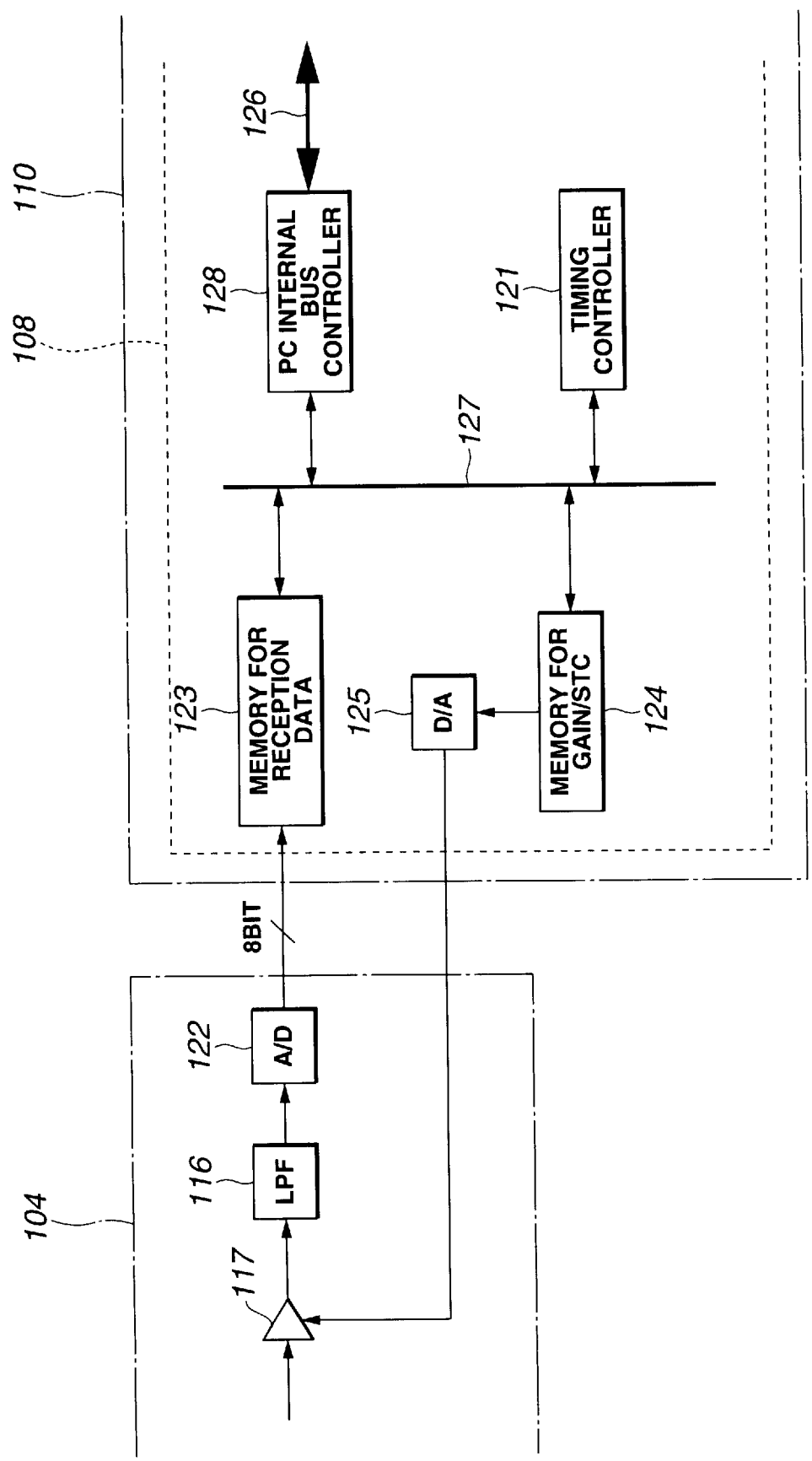

Although the reception signal outputted from the receiving/transmitting unit 104 is an analog signal and the A/D converter 122 converts the analog signal into a digital signal on the PC board 108 side, the A/D converter 122 may be mounted to the receiving/transmitting unit 104, and the analog signal may be converted into the digital signal and outputted to the memory 123 for reception data on the PC board 108, as shown in FIG. 5.

As shown in FIG. 5, if the A/D converter 122 is provided for the receiving/transmitting unit 104 and the digital data outputted by the A/D converter 122 is stored into the memory 123 for reception data on the PC board 108, it is necessary to transfer the reception data fast.

Figure 6:
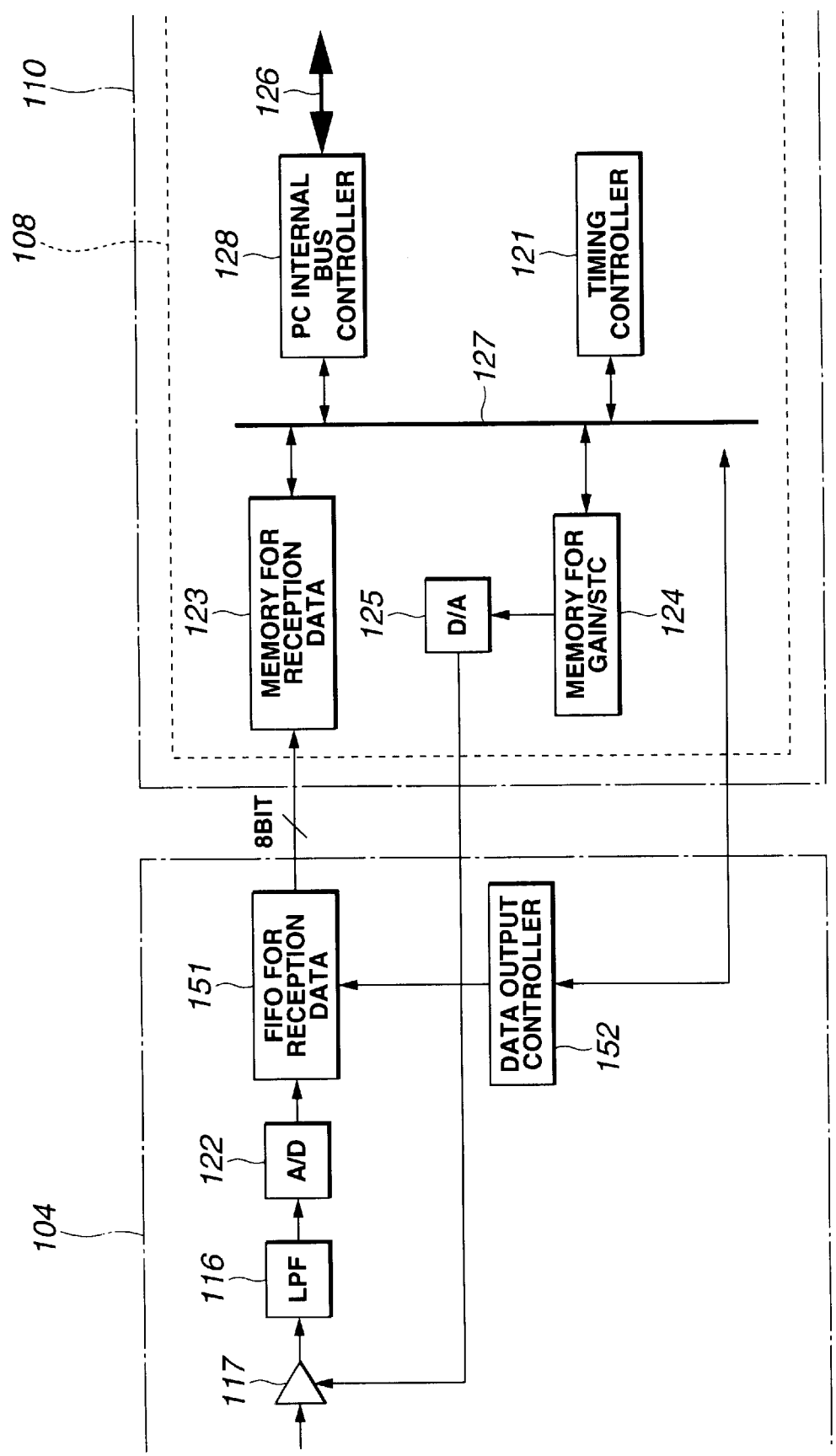

As shown in FIG. 6, it is sufficient that a FIFO 151 for reception data is provided to the output terminal of the A/D converter 122 in the receiving/transmitting unit 104, the reception data is temporarily stored to the FIFO 151, and a data output controller 152 provided for the receiving/transmitting unit 104 transfers the reception data to the memory 123 for reception data on the PC board 108 at a relatively low speed.

Second Embodiment (Constitution)

Figure 7:
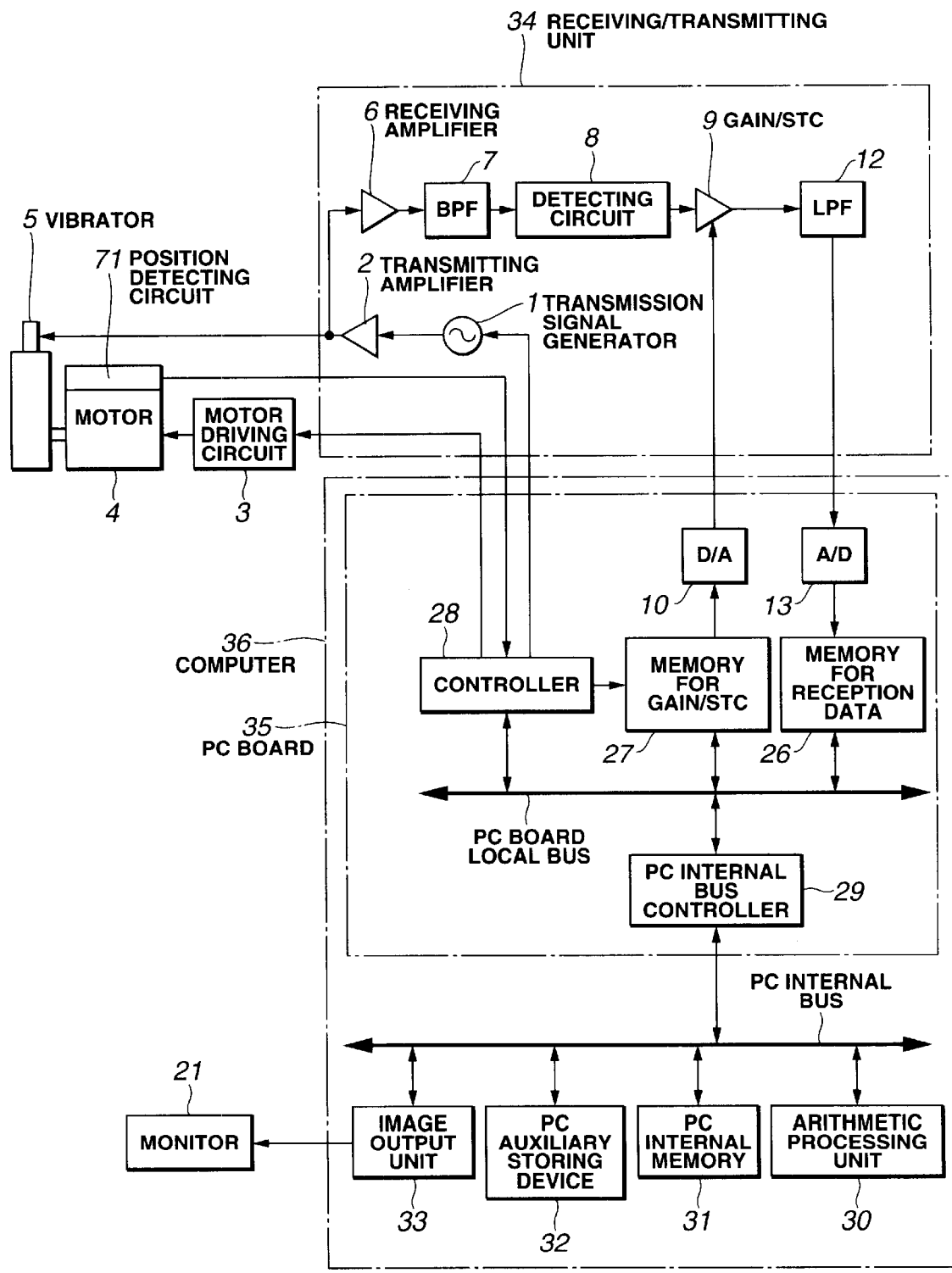
FIG. 7 is a block diagram showing the whole construction of the ultrasonic diagnostic apparatus of the mechanical scanning system.
Figure 20:
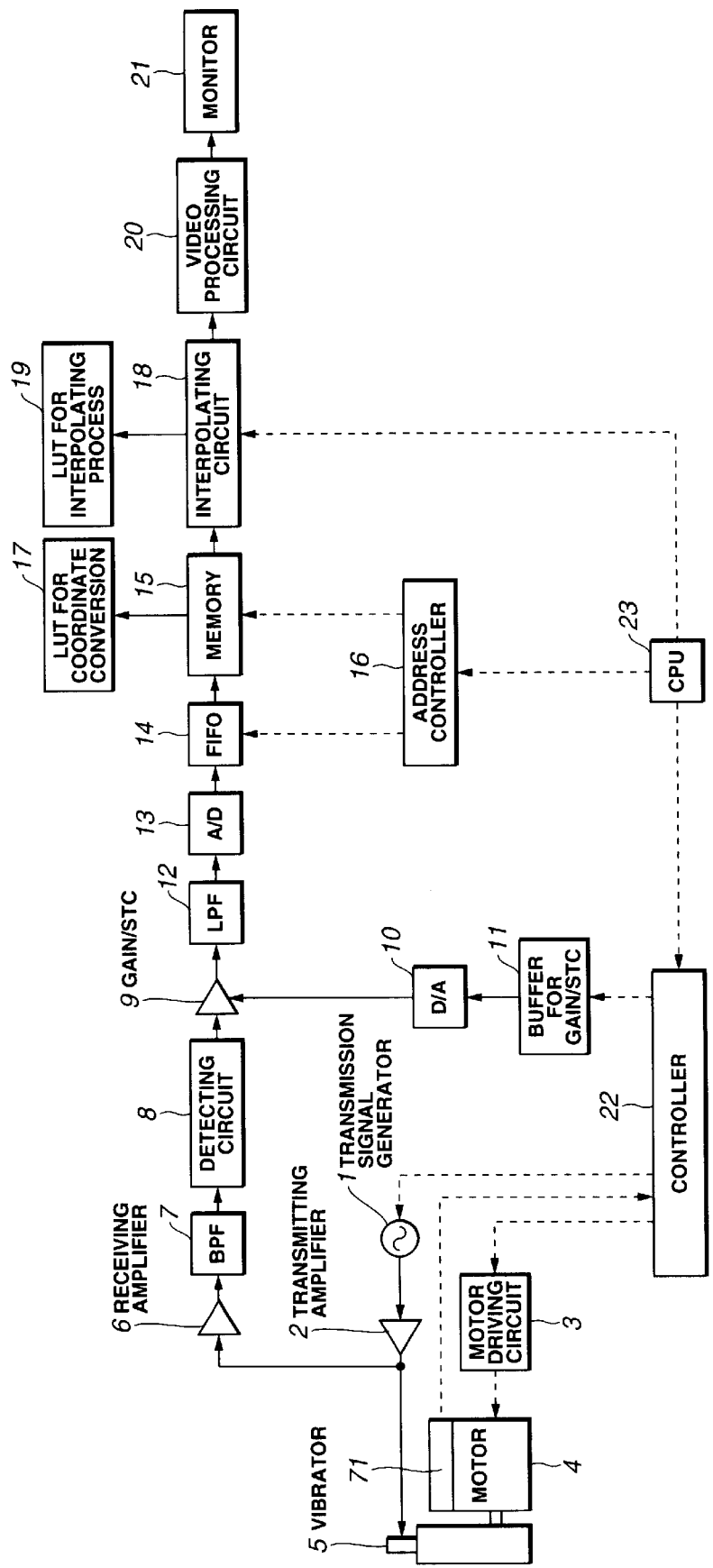
FIG. 20 is a block diagram showing the whole construction of one example of a conventional ultrasonic diagnostic apparatus of the mechanical scanning system.
Figure 21:
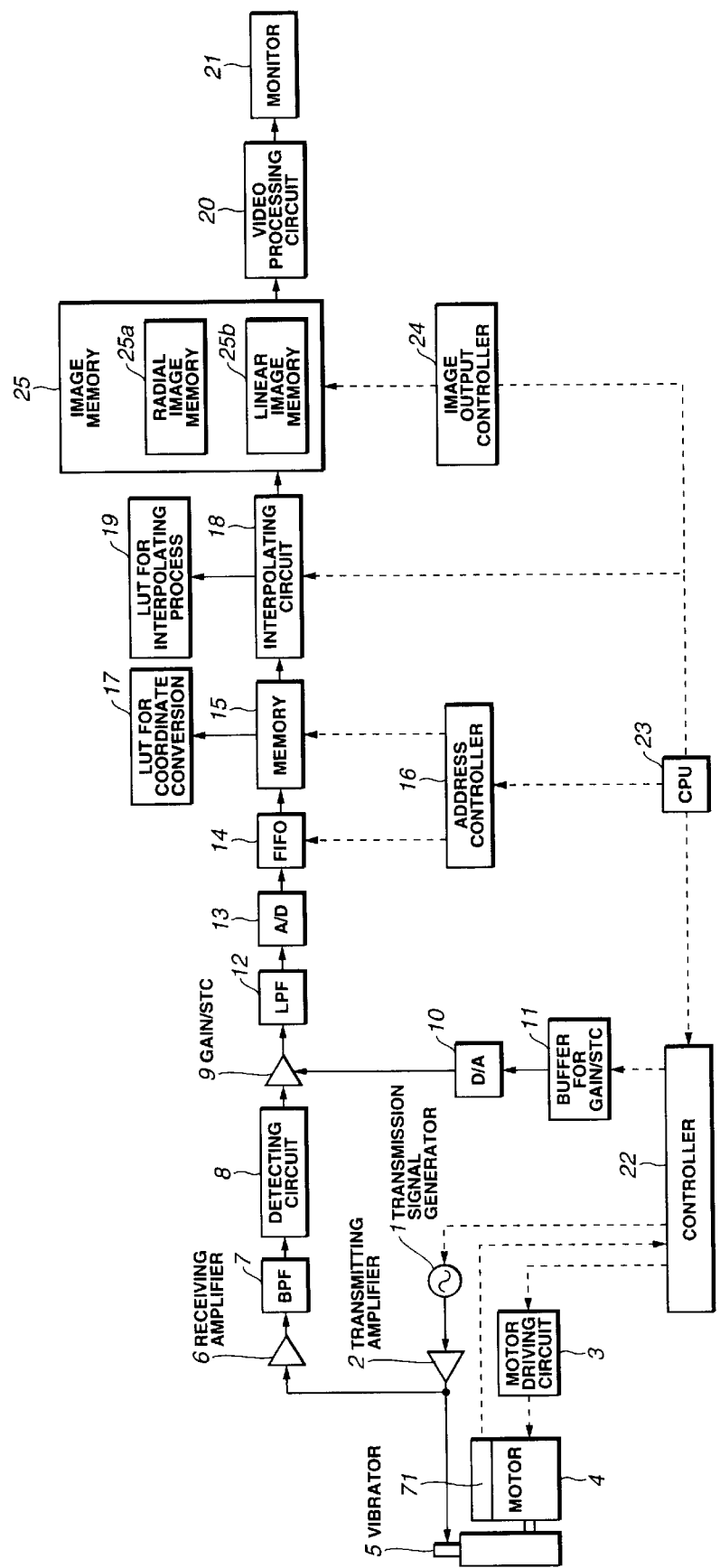
FIG. 21 is a block diagram showing the whole construction of another ultrasonic diagnostic apparatus of the mechanical scanning system capable of conventional linear image display.

Referring to FIG. 7, the same reference numerals denote the same element components as those of the apparatus in FIGS. 20 and 21. According to the present embodiment, a system as an ultrasonic diagnostic apparatus is constructed by combining the receiving/transmitting unit 34, the computer 36, and the monitor 21 which are constructed by conventional element components, without using the coordinate transformation and the interpolating dedicated circuit which cause the complication and the large costs. The system is also constructed to enable the execution of the process for coordinate-transformation and interpolation, etc. under the control operation by the PC board in the computer 36.

According to a specific construction as shown in FIG. 7, the ultrasonic diagnostic apparatus of the present embodiment comprises: the receiving/transmitting unit 34 including the transmission signal generator 1 and the transmitting amplifier 2; the vibrator 5, the position detecting circuit 71, the motor 4, and the motor driving circuit 3 which are connected to the receiving/transmitting unit 34 electrically; a PC board 35 in the computer 36 which is electrically connected to the motor driving circuit 3 and the receiving/transmitting unit 34; and the monitor 21 which is connected to the PC board 35 electrically and displays the ultrasonic image.

The receiving/transmitting unit 34 is a portion to/from which the ultrasonic wave is received and transmitted, and comprises: the transmission signal generator 1; the transmitting amplifier 2; the receiving amplifier 6; the BPF 7; the detecting circuit 8; the GAIN/STC 9, and the LPF 12.

The transmission signal generator 1 oscillates a transmission signal as a reference by the control operation of a controller 28 in the computer 36, and supplies the oscillation signal to the transmitting amplifier 2. The transmitting amplifier 2 amplifies the oscillation signal, for example, to a preferable level to emit the signal as an ultrasonic pulse in vivo by using the vibrator 5, and supplies the amplification signal to the vibrator 5.

The motor driving circuit 3 is controlled in response to a timing signal from the controller 28 in the computer 36, and supplies a motor drive signal to the motor 4. The drive of the motor 4 is controlled on the basis of the motor drive signal from the motor driving circuit 3, and the motor 4 rotates the vibrator 5 mounted to the rotary shaft so that the vibrator 5 becomes the center of the rotation.

The vibrator 5 fetches a synchronous signal outputted from the position detecting circuit 71 to the controller 22 by the rotation of the vibrator 5, is made synchronous with the timing signal, and emits the ultrasonic pulse. The vibrator 5 also sets transmission signal supplied from the transmitting amplifier 2 to an ultrasonic pulse and emits the ultrasonic pulse, for instance, in vivo, in accordance with the rotation.

The vibrator 5 receives a reflecting wave which is reflected from the biogenic tissue, and supplies the reception signal to the receiving amplifier 6. The receiving amplifier 6 amplifies the reception signal to a predetermined level. The BPF 7 supplies the signal to the detecting circuit 8 after removing a predetermined frequency (unnecessary signal component). The detecting circuit 8 subjects a fetched signal to the detecting process, and supplies the signal to the GAIN/STC 9 as a variable amplifier which can vary the amplification factor.

The GAIN/STC 9 can vary the amplification factor freely by the control operation on the computer 36 side, and amplifies the supplied signal to a predetermined size and supplies the amplification signal to the LPF 12. A low band component of the supplied signal passes through the LPF 12 and the LPF 12 supplies the signal to the PC board 35 in the computer 36.

The receiving/transmitting unit 34 is electrically connected to the PC board 35 in the computer 36 provided newly, via connecting means (not shown) which is provided for the computer 36.

The PC board 35 is a board mounted to the a bus in the computer 36 detachably, and comprises: a D/A converter 10; the A/D converter 13; the memory 26 for reception data; a memory 27 for GAIN/STC; the controller 28; and an PC internal bus controller 29.

The controller 28 is connected to the transmission signal generator 1 in the receiving/transmitting unit 34 and the motor driving circuit 3, and controls the oscillation of the transmission signal and the motor drive by supplying the timing signal. The controller 28 is also connected to a PC board local bus.

Stored to the memory 27 for GAIN/STC is information necessary for varying the amplification factor of the GAIN/STC 9 in the receiving/transmitting unit 34. The D/A converter 10 analog-converts the information which is read out by the control operation of the controller 28, and supplies the analog signal to the GAIN/STC 9, thereby changing the amplification factor of the GAIN/STC 9.

The A/D converter 13 is connected to the LPF 12 in the receiving/transmitting unit 34, digital-converts the supplied signal from the LPF 12, and supplies the digital signal to the memory 26 for reception signal. The memory 26 for reception data stores the supplied reception data, and outputs the read-out reception data onto the PC internal bus by way of the PC board local bus and the PC internal bus controller 29, upon reading out the data.

The PC internal bus controller 29 can input/output data among all of the circuits connected to the PC internal bus and control a bus path and the like in accordance with the input/output, and is instructed and controlled by an arithmetic processing unit 30 as main control means in the computer 36.

The computer 36 having the PC internal bus comprises: the PC board 35 connected onto the PC internal bus; the arithmetic processing unit (also referred to as a CPU) 30; a PC internal memory 31 as means for storing data and a program; a PC auxiliary storing device 32; and an image output unit 33. The monitor 21 as display means for displaying the ultrasonic image is connected to the image output unit 33 in the computer 36 through connecting means of the computer (not shown).

The arithmetic processing unit 30 is a processing circuit for performing a calculating process (such as coordinate transformation and interpolating process) necessary for executing the image display in accordance with an output mode, serving as a feature of the present invention, in the computer 36. A program necessary for the calculating process is stored into the PC internal memory 31. The PC internal memory 31 stores data from the PC board 35 temporarily.

The PC auxiliary storing device 32 is a spare storing device, can store, for instance, a program necessary for the arithmetic process, the reception data, and the like, and also can use a storing area of the PC auxiliary device 32 if the storing area is insufficient in accordance with the process such as the arithmetic process.

The image output unit 33 subjects the data supplied through the PC internal bus to a displaying process based on the output mode of a selected image, and supplies the processed signal to the monitor 21. The monitor 21 displays an image based on data processed by the computer 36.

(Operation)

The next description turns to the operation of the ultrasonic diagnostic apparatus shown in FIG. 7.

An ultrasonic diagnostic image in the celom is displayed to the monitor by utilizing the ultrasonic diagnostic apparatus shown in FIG. 7. starting the examination by the ultrasonic diagnostic apparatus, the controller 28 first drives the motor 4 via the motor driving circuit 3, thereby rotating the vibrator 3.

The vibrator 5 fetches a synchronous signal outputted from the position detecting circuit 71 into the controller 28 by the rotation of the vibrator 5. Synchronously with the fetched signal, the vibrator 5 is synchronized with a timing signal of the controller 28. The transmission signal generator 1 and the transmitting amplifier 2 transmit the ultrasonic pulse, for example, around the portion in the celom by employing the vibrator 5.

The vibrator 5 receives a reflecting wave which is reflected from the biogenic tissue, and the receiving amplifier 6 amplifies the reception signal to a predetermined size. The BPF 7 removes an unnecessary noise component from the amplified reception signal, and the GAIN/STC 9 thereafter amplifies the signal to a predetermined size. In this case, since the propagation time of the reflecting wave elapses if the portion at which the ultrasonic pulse is emitted is located remotely, there might be a possibility to decrease more the level of the reception signal which received the reflecting wave, with the elapse of more time. Therefore, in this case, the control operation by the controller 28 corrects the reception signal which becomes smaller as the signal is positioned more remotely, so as to become larger upon the amplification by the GAIN/STC 9.

After that, the output of the reception signal from the GAIN/STC 9 is supplied to the LPF 12, and thus only the low band component of the supplied signal passes through the LPF 12. The passing reception signal is outputted from the receiving/transmitting unit 34 to the computer 36 side.

On the side of the computer 36, the reception signal outputted from the receiving/transmitting unit 34 is inputted to the PC board 35 mounted to the PC internal bus in the computer 36.

The reception signal inputted to the PC board 35 is converted into the digital signal by the A/D converter 13, and stored into the memory 26 for reception data. In this case, if storing the data of one frame into the memory 26 for reception data, the data from the memory 26 for reception data passes through the PC internal bus controller 29 connected via the local bus of the PC board 35, and is transferred to the PC internal memory 31 in the computer 36 via the PC internal bus.

With regard to data transfer to the PC internal memory 31, based on a position signal which is outputted from the position detecting circuit 71 by the rotation of the vibrator 5 and synchronized with the rotation, a start signal of the data transfer is outputted from the controller 28 to the PC internal bus controller 29, thereby transferring the data by the PC internal bus controller 29 from the memory 26 for reception data via the PC internal bus.

Figure 8:
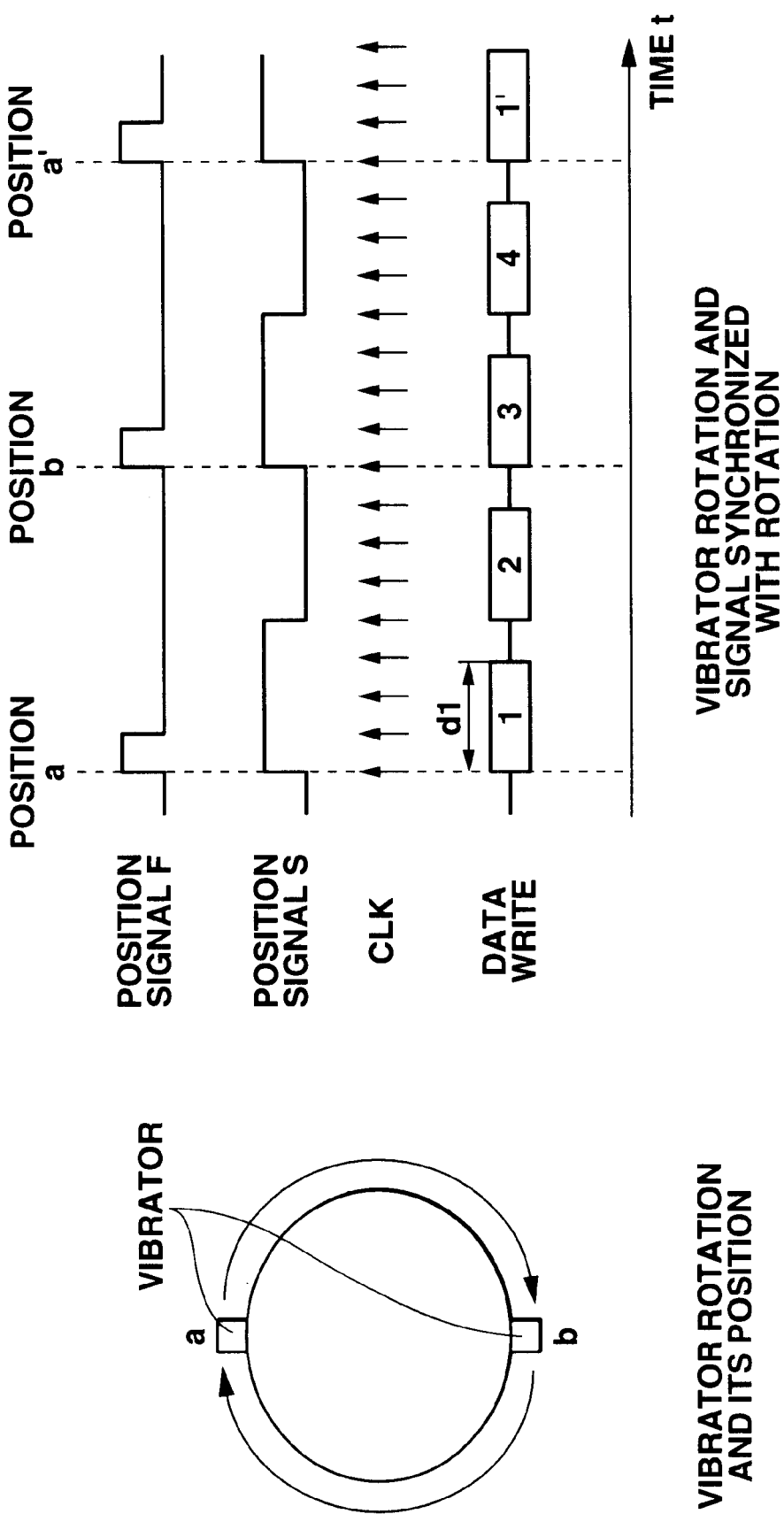
FIG. 8A is a first diagram showing a relationship between the rotation of a vibrator and a position signal synchronized with the rotation.
FIG. 8B is a second diagram showing a relationship between the rotation of the vibrator and the position signal synchronized with the rotation.

FIGS. 8A and 8B illustrate a relationship between the rotation of the vibrator 5 and the position signal synchronized with the rotation. FIG. 8A illustrates the rotation of the vibrator 5 and the position thereof, and FIG. 8B illustrates the timing among position signals F and S which are outputted correspondingly to the rotation of the vibrator 5 in FIG. 8A, a clock signal (denoted CLK), and a data writing signal indicative of a period for writing echo data to the memory 26 for reception data onto the PC board 35. Note that the data writing signal is outputted synchronously with logical change of the position signal S.

If the vibrator 5 is located at "a" in FIG. 8A, logical signals of the position signals F and S are outputted to the position "a" in FIG. 8B. If the vibrator 5 is located at "b" in FIG. 8A, logical signals of the position signals F and S are outputted to the position "b" in FIG. 8B. "a'" in FIG. 8B shows the signal logic of the position signals F and S which are outputted when the vibrator 5 in FIG. 8A executes one rotation and located at "a" again.

The data writing period in FIG. 8B is "d1". The CLK signal has a period of 3 CLKs.

Figures 9, 10:
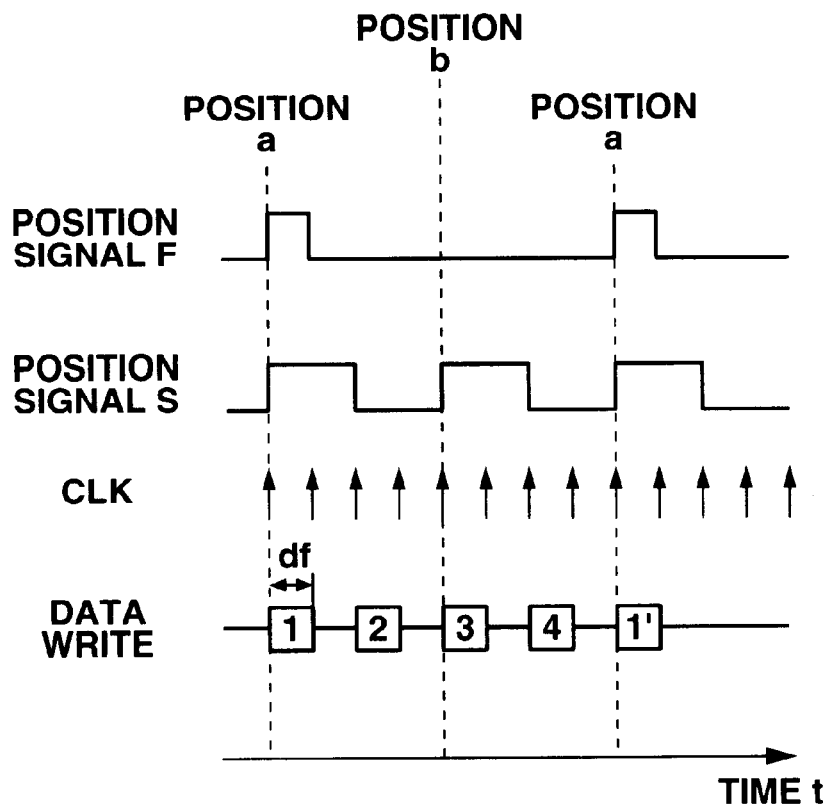
FIG. 9 is a timing chart when the rotation of the vibrator becomes faster.
FIG. 10 is a diagram showing one example of a register of the controller in FIG. 1.

FIG. 9 illustrates the timing when the vibrator 5 rotates faster.

Referring to FIG. 9, the period of the position signal S has 2 CLKs. If data is written during the data write period d1 in FIG. 8B, the timing in this case is overlapped to a second data write period when the data writing operation starts at the trailing of the position signal S, so that the second data writing operation cannot be performed. In such a case, the data write period is shortened by 1 CLK and, therefore, it is possible to obtain data certainly by making the periods of the position signals F and S correspond to the high-speed.

The data writing period may be set by preparing a register to the controller 29 and accessing the register by software. FIG. 10 shows one example of the register.

When the position signals F and S have timings in FIG. 9, the number of data writing times (equivalent to a data writing period df) corresponding to the position signals F and S in FIG. 9 is set to the number of data writing operations at an address 0 of the resister shown in FIG. 10. Based on the setting, the data writing timing in FIG. 9 is obtained. When the position signals F and S have timings in FIG. 8B, the number of data writing times (equivalent to a data writing period d1) corresponding to the position signals F and S in FIG. 8B is set to the number of data writing times at the address 0 of the resister shown in FIG. 10. Based on the setting, the data writing timing in FIG. 8B is obtained.

It is to be noted that the foregoing does not limit the relationship among the number of pulses and the pulse length of the position signals F and S and the CLK signal in FIGS. 8B and 9. Although changing only the data writing signal which is outputted correspondingly to the periods of the position signals F and S in the aforementioned case, this doe not limit the adjustment corresponding to the periods of the position signals F and S. If there is a signal necessary for adjustment correspondingly to the periods of the position signals F and S, the signal may be a target of the adjustment and a register for adjusting a parameter may be prepared in FIG. 4. Further, a plurality of parameters may be adjusted correspondingly to the periods of the position signals F and S.

Although the foregoing corresponds to the change in period of the position signal which is obtained by rotating the vibrator 5 and outputted synchronously with the rotation, it is sufficient to adapt to the change in periods of the position signals which are obtained by moving the vibrator 5 in the horizontal direction and synchronizing the signal with the rotation. Further, it is sufficient to adapt to the change in position signal which is outputted synchronously with the drive by combining the rotation of the vibrator 5 and the horizontal direction thereof.

It is possible to reduce the data transfer time and the load on the arithmetic processing unit 30 upon data transfer by utilizing a direct memory access (referred to as a DMA, hereinbelow) to transfer the data to the computer 36 which is synchronized with the rotation of the vibrator 5, not through the arithmetic processing unit 30 in the computer 36, and transferring reception data to the PC internal memory 31 from the memory 26 for reception data once.

Figure 13:
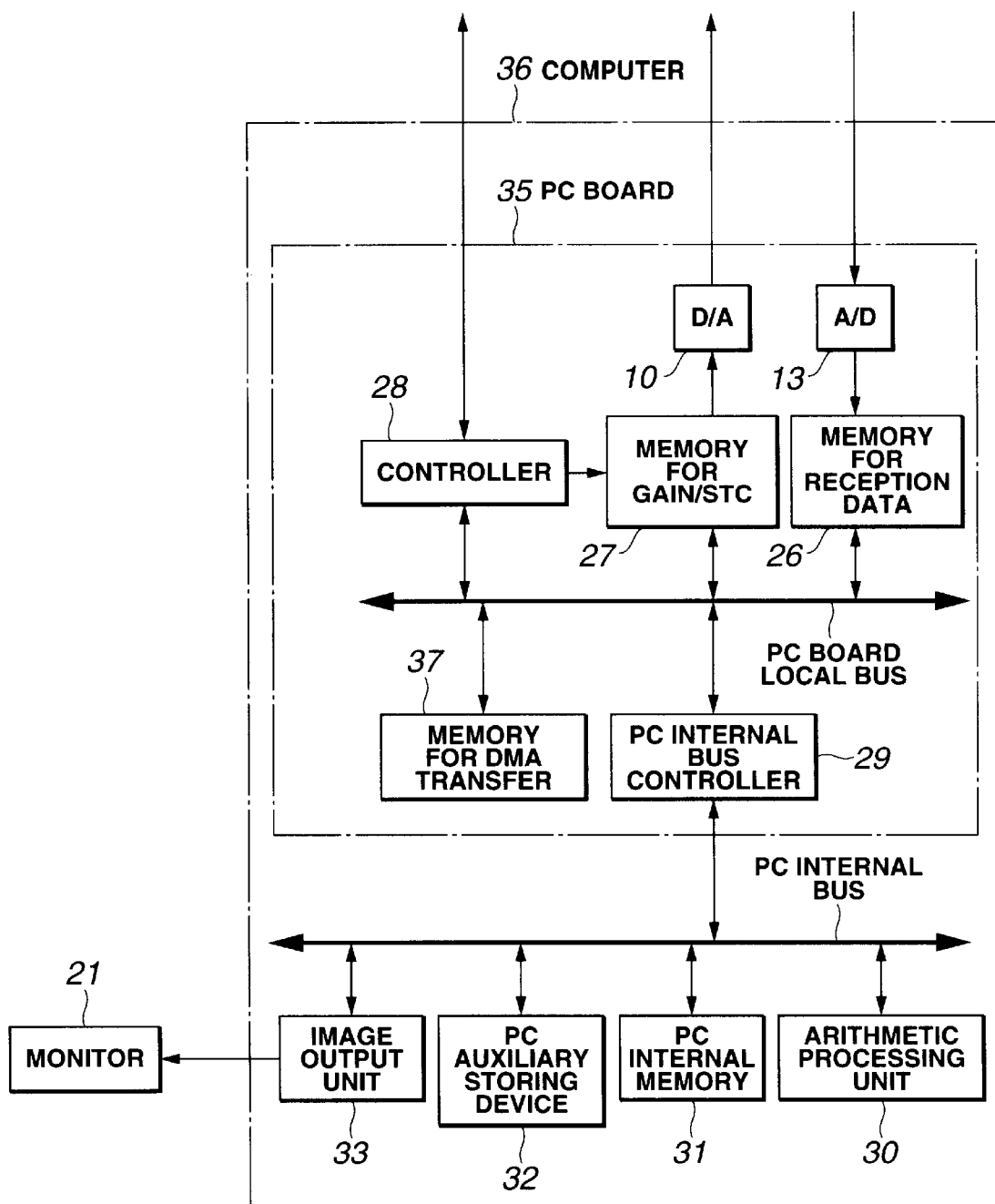
FIG. 13 is a block diagram showing a construction of a computer 36 portion of an apparatus which is constructed to enable DMA transfer more efficiently.

Moreover, FIG. 13 shows a construction whereby data is DMA-transferred more efficiently.

FIG. 13 is a block diagram showing a construction of the computer 36 portion in the apparatus which is constructed to enable data to be DMA-transferred more efficiently, as mentioned above, and has the construction to add a memory 37 for DMA transfer to the PC board local bus as a component element of the PC board 35 in FIG. 7.

As shown in FIG. 13, preliminarily stored to the memory 37 for DMA transfer are an address of a transfer source, an address of a transfer destination, and parameters of transfer capacity, etc. under software which operates on the computer 36 before DMA transfer. In other words, a data transfer starting register of the PC internal bus controller 29 is made effective by providing the memory 37 for DMA transfer, thereby enabling the DMA transfer to be executed while the PC internal bus controller 29 reads out the parameters from the memory 37 DMA for DMA transfer.

It is exemplified that it might be impossible to secure a storing area sequential to the PC internal memory 31, depending on an OS of the computer 36 as a transfer destination. If setting the memory 26 for reception data on the PC board 35 to the address as a transfer source and the PC internal memory 31 in the computer 36 to the address as a transfer destination as well as the capacity of data blocks to be transferred in the blocks, reception data is transferred from the memory 26 for reception data on the PC board 35 to the PC internal memory 31 in the computer 36 by separating the blocks into a plurality of blocks. Since it is unnecessary that the software secure the address as a transfer source, address as a transfer destination, and the data storing area, upon data transfer, it is able to reduce the load on the software and implement the DMA transfer efficiently.

As mentioned above, the reception data is transferred to the PC internal memory 31, and the arithmetic processing unit 30 thereafter executes the process as a feature of the present embodiment. That is, the ultrasonic image data is generated by subjecting the reception data transferred to the PC internal memory 31 to the coordinate transformation and interpolating process on the program stored to the PC internal memory 31 by the arithmetic processing unit 30. The generated ultrasonic image data is stored to the PC internal memory 31, and the ultrasonic image is outputted to the monitor 21 via the image output unit 33.

Note that not only the ultrasonic image data and reception data are stored to the PC internal memory 31 but also they may be stored to the PC auxiliary storing device 32 if there is no influence to the processing time of the program.

Figure 11:
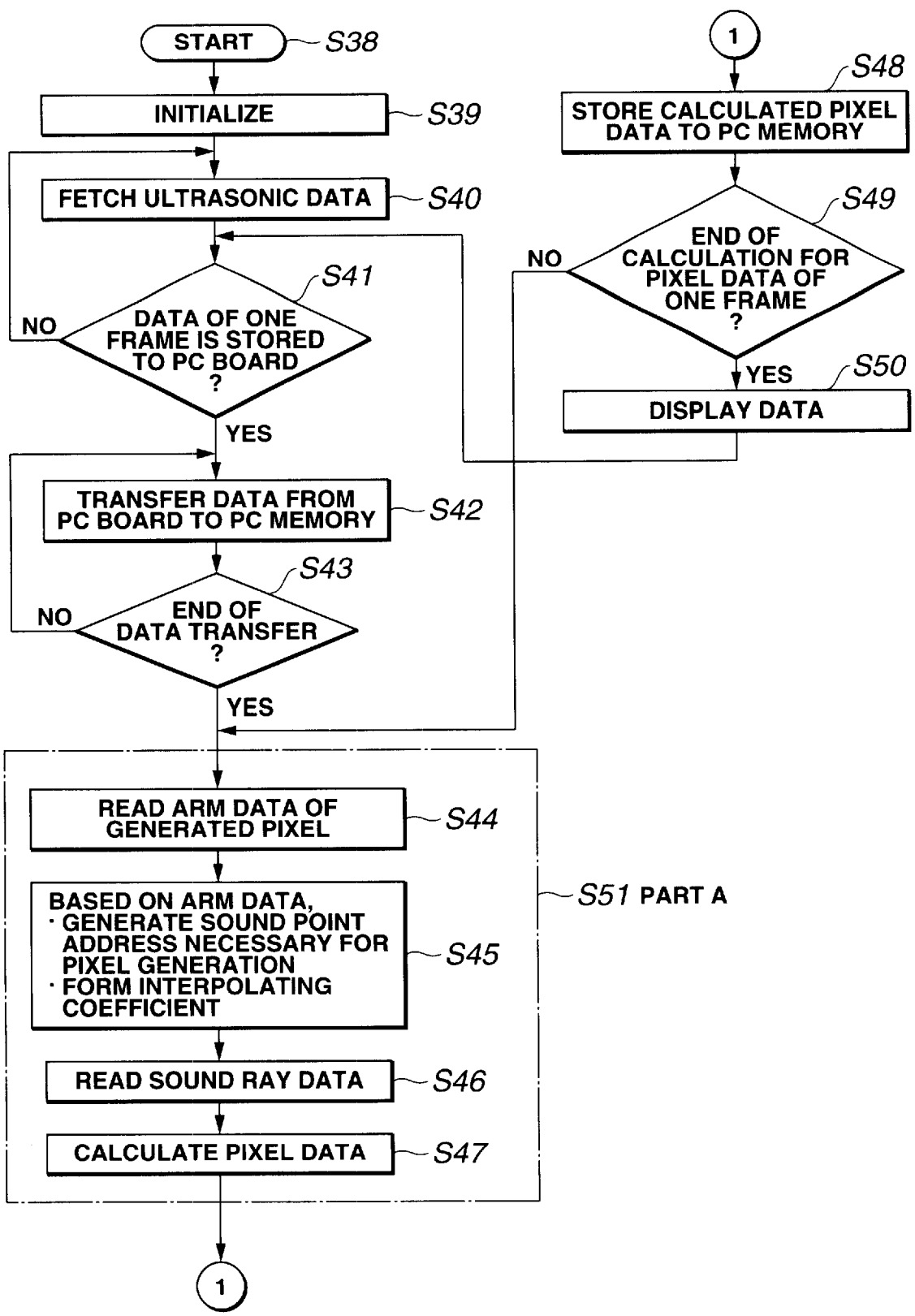
FIG. 11 is a flowchart for explaining a control operation example in an arithmetic processing unit (CPU) shown in FIG. 1.

The next detailed description turns to the processing operation which is executed by the DMA transfer operation and the arithmetic processing unit 30 with reference to FIG. 11.

FIG. 11 is a flowchart including the process executed by the DMA transfer operation and the arithmetic processing unit 30 to explain an example of a control operation by the arithmetic processing unit (CPU) in the ultrasonic diagnostic apparatus.

First of all, if activating the arithmetic processing unit 30 in the computer 36, the arithmetic processing unit 30 starts the program by a process in step S38, and the PC board 35 is initialized, etc. in step S39.

After initializing, the processing routine advances to a process in step S40. By the process, an operation for fetching the ultrasonic data is instructed to the PC board 35. The PC board 35 and the receiving/transmitting unit 34 store the reception signal to the memory 26 for reception data on the PC board 35, and the processing routine advances to a process in step S41.

In the process in step S41, it is determined whether or not the reception data of one frame is stored to the memory 26 for reception data. If NO in step S41, the processing routine returns to a process in step S40, and the reception data is stored to the memory 26 for reception data. If YES in step S41, the processing routine advances to a subsequent process in step S42.

In the process in step S42, DMA-transferred to the PC internal memory 31 in the computer 36 is the reception data stored to the memory 26 for reception data on the PC board, because the data of one frame is stored to the memory 26 for reception data. The processing routine advances to step S43.

In the process in step S43, it is determined whether or not the DMA transfer ends. If YES in step S43, the processing routine advances to a series of processes as coordinate transformation and interpolating process in step S51. If NO in step S43, the processing routine returns to step S42.

Figure 14:
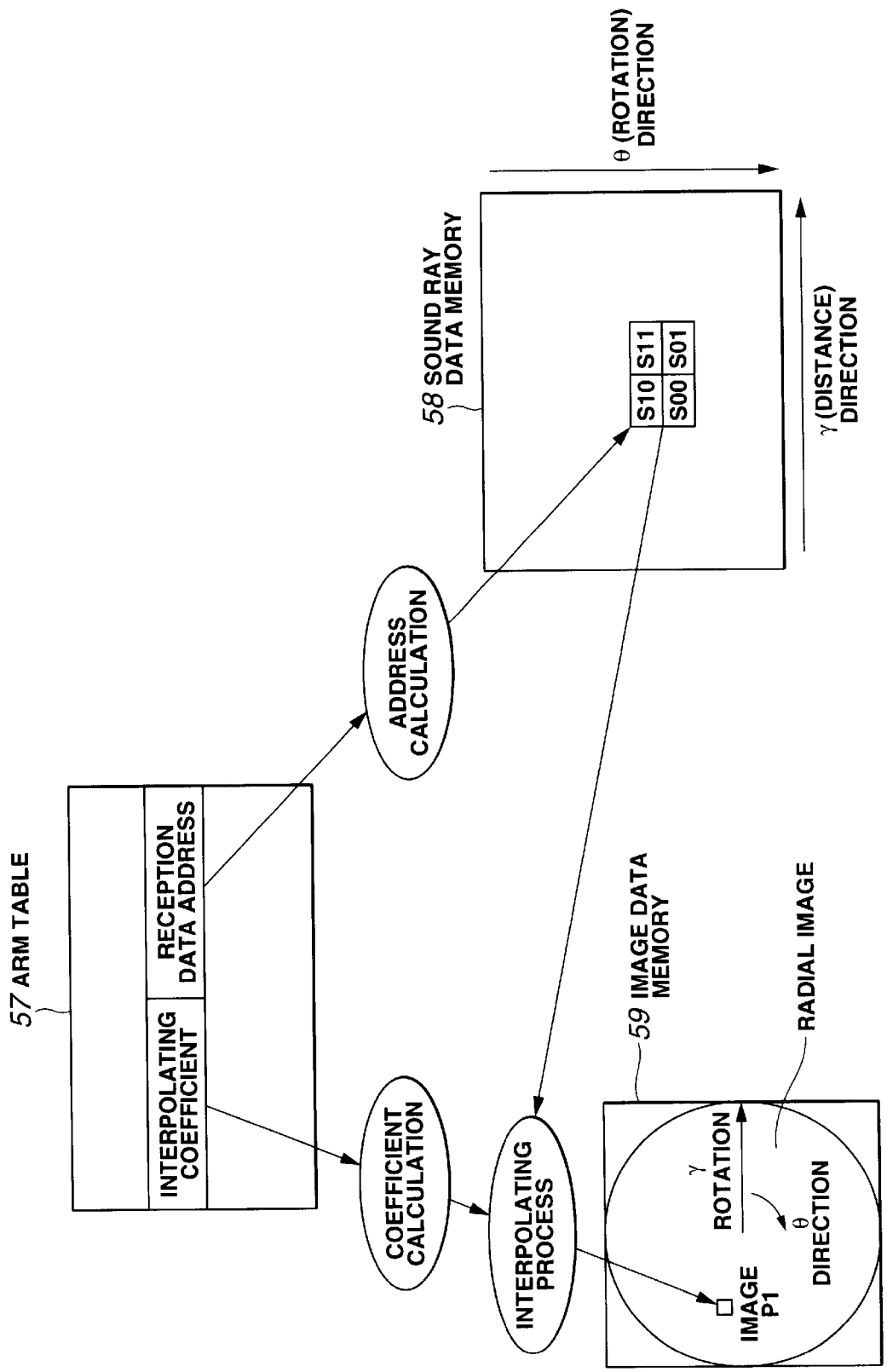
FIG. 14 is an explanatory diagram for explaining a concept of a coordinate transformation and an interpolating process.

Before discussing the processes in step S51, the detailed description turns to a concept of the coordinate transformation and interpolating process as a feature of the present invention with reference to FIG. 14.

The PC internal memory 31 in the computer 36 is provided with, for instance, an ARM table 57, a sound ray data memory 58, and an image data memory 59, as shown in FIG. 14.

Stored to the ARM table 57 are an interpolating coefficient necessary for generating an arbitrary pixel and an address of the sound ray data memory 58 to which the reception data is stored.

The reception data is stored to the sound ray data memory 58 so that the reception data corresponds to an r (distance) direction in accordance with the propagation distance during the ultrasonic wave is transmitted and received and a θ (angle) direction in accordance with an angle of the vibrator rotation.

The reception data stored to the sound ray data memory 58 is stored to the image data memory 59 by the correspondence so that the reception data forms a radial image by executing the coordinate transformation and the interpolating process.

Under the aforementioned construction, if obtaining an arbitrary pixel P1 in the image data memory 59, there are read out an interpolating coefficient corresponding to an arbitrary pixel in the ARM table 57 and the address of the sound ray data memory 58.

It is exemplified that there are stored to the ARM table 57 the interpolating coefficient and the address of the sound ray data memory 58 which stores the reception data used to obtain the arbitrary pixel P1, as one set of table data. By performing the calculation for adding an arbitrary offset to the reception data address of the table data and reading out the reception data (S00, S01, S10, and S11) necessary for obtaining the arbitrary pixel P1 from the sound ray data memory 58, the reception data is coordinate-transformed.

An interpolating coefficient parameter is calculated from the interpolating coefficient of the table data which is read out from the ARM table 57. The interpolating operation is executed, based on the interpolating coefficient parameter and the read-out reception data (S00, S01, S10, and S11). The result is stored to the image data memory 59.

Figures 16, 17:
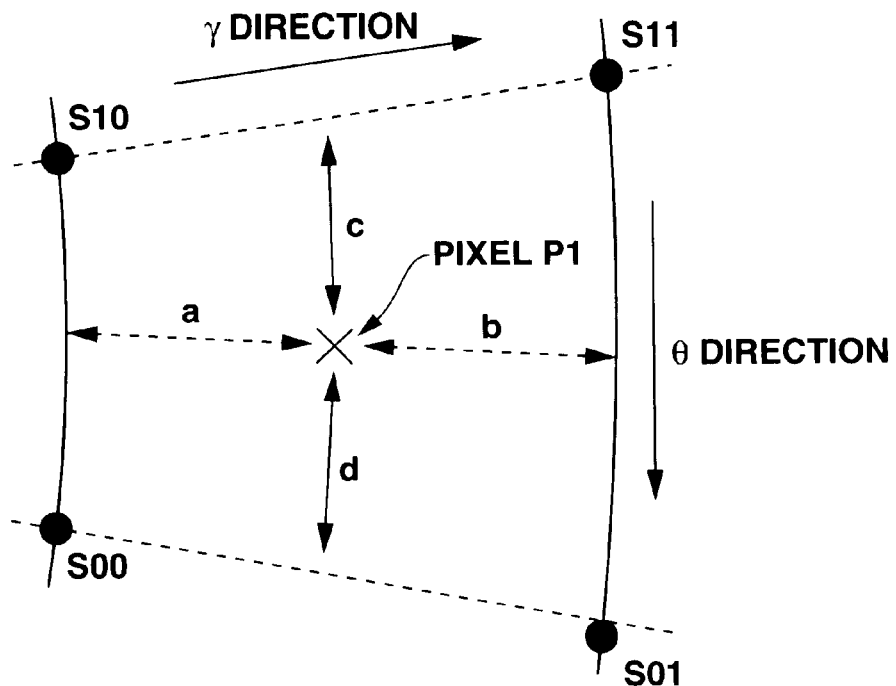
FIG. 16 is an explanatory diagram for explaining a four-point interpolating process based on the interpolating process.
FIG. 17 is an explanatory diagram when processing based on the arithmetic processing unit having a function for processing a plurality of items of data by a single command, FIGS. 18 to 19C relate to a third embodiment of the present invention.

The interpolating process in the step to obtain the arbitrary pixel P1 employs a four-point interpolation and the contents thereof are shown in FIG. 16.

Referring to FIG. 16, S00 to S11 correspond to the reception data stored to the sound ray data memory 58 shown in FIG. 14. (S00 and S01) and (S10 and S11) exist on the same sound rays, respectively. The pixel P1 is obtained by the interpolating process by the use of those reception data. Assuming that "a" denotes the shortest distance (distance in the r direction) between a line joining S10 and S00 and the pixel P1; "b" the shortest distance (distance in the r direction) between a line joining S11 and S01 and the pixel P1; "c" the shortest distance (distance in the θ direction) between a line joining S10 and S00 and the pixel P1; and "d" the shortest distance (distance in the θ direction) between a line joining S11 and S01 and the pixel P1, it is capable of obtaining the pixel P1 on the basis of the four points of S00 to S11 and the parameters "a" to "d" by the following formulae.

$$S0=(a/(a+b)\cdot S11)+(b/(a+b)\cdot S10) \quad (1)$$

$$S1=(a/(a+b)\cdot S01)+(b/(a+b)\cdot S00) \quad (2)$$

$$P1=(d/(c+d)\cdot S0)+(c/(c+d)\cdot S1) \quad (3)$$

If calculating the above formulae (1) to (3) according to the method shown in FIG. 14, items of a/(a+b), b/(a+b), d/(c+d), and c/(c+d) are set to interpolating coefficients and stored to the ARM table 57, thereby using the stored interpolating coefficients for the interpolating process.

The above formulae (1) to (3) are developed to a command which can be arithmetically operated by the arithmetic processing unit 30, thereby executing the arithmetic operation.

As an example, FIG. 17 shows a case of a process by the CPU (arithmetic processing unit 30) that uses an MMX technology produced by Intel Corporation having a function for processing a plurality of pieces of data by a single command as the arithmetic processing unit 30.

FIG. 17 is the diagram for explaining a sum of products arithmetic command pmaddwd which is peculiar to the CPU, and as a result of processing data stored to registers mm1 and mm2, the data is stored to the register mm1. It is assumed to store the data which are made different by depending upon a unit of four corners on the right side, to the registers, in a lump. Note that the register on the right side is an LSB and that on the left side is an MSB. If applying the command to the arithmetic operation based on the formulae (1) and (2), coordinate-transforming coefficient data is stored to the register mm1 and the reception data of the sound ray data memory used for the coordinate transformation is stored to the register mm2. Thus, the result of the formula (1) is stored to the higher rank of mm1 and the result of the formula (2) is stored to the lower rank of mm2. Therefore, it is able to implement the arithmetic operation of the formulae (1) and (2) simultaneously by a single command. So long as utilizing the computer provided with the CPU having a function for arithmetically operating the sum of products and the like at a high speed, it is possible to implement the coordinate-transforming process in real time.

Although the foregoing description relates to the CPU (arithmetic processing unit 30) provided with the MMX technology produced by Intel Corporation, so long as using the arithmetic processing unit having a function for processing a plurality of pieces of data simultaneously by the similar single command, this does not restrict the CPU.

The description returns to the processing routine subsequent to a process in step S44 in the flowchart shown in FIG. 11.

Referring to FIG. 11, after the end of DMA transfer by the process in step S43, the processing routine advances to a process in step S44. The parameters for coordinate transformation and interpolating process corresponding to the pixel generated by the process is read from the ARM table 57 (referred to in FIG. 14). A process in step S45 is to form the address of the sound ray data memory 58 to which the reception data necessary for pixel generation and form the interpolating coefficient parameters, based on the ARM table 57.

In a process in step S46, the reception data is read from the sound ray data memory 58. In a process in step S47, the read-out reception data is subjected to the interpolating process on the basis of the interpolating coefficient parameters and pixel data is calculated. The calculated result is stored to the PC internal memory 31 by a process in step S48, and the processing routine advances to a process in step S49.

In a discriminating process in step S49, it is determined whether or not the pixels of the ultrasonic image of one frame are subjected to the calculating process on the basis of the processes in steps S44 and S48. If YES in step S49, that is, if it is determined that the image data of one frame is calculated, the processing routine advances to a process in step S50. If NO in step S49, the processing routine returns to the process in step S44 and the process is repeated until the ultrasonic image of one frame is obtained.

After calculating the image data of one frame in step S49, the result is displayed by the process in step S50. The processing routine returns to step S41 again, and it is determined whether or not the one-frame data is stored to the memory 26 for reception data on the PC board 35 by the process in step S41.

The processes in steps S40 to 43 may be processed as a task to be executed separately from the process in step S51 Consequently, it is possible to implement the processes from the process for fetching the ultrasonic data in step S40 to the process for transferring data from the PC board to the PC memory in step S42 without waiting for the process in step S51, so that it is possible to use the processing capacity of the computer 36 and improve the processing capacity.

According to the present embodiment, the program processed on the basis of the flowchart in FIG. 11 is stored to the PC auxiliary storing device 32 before initializing the computer 36, stored to the PC internal memory 31 after initializing the computer 36, and executed.

Figure 12:
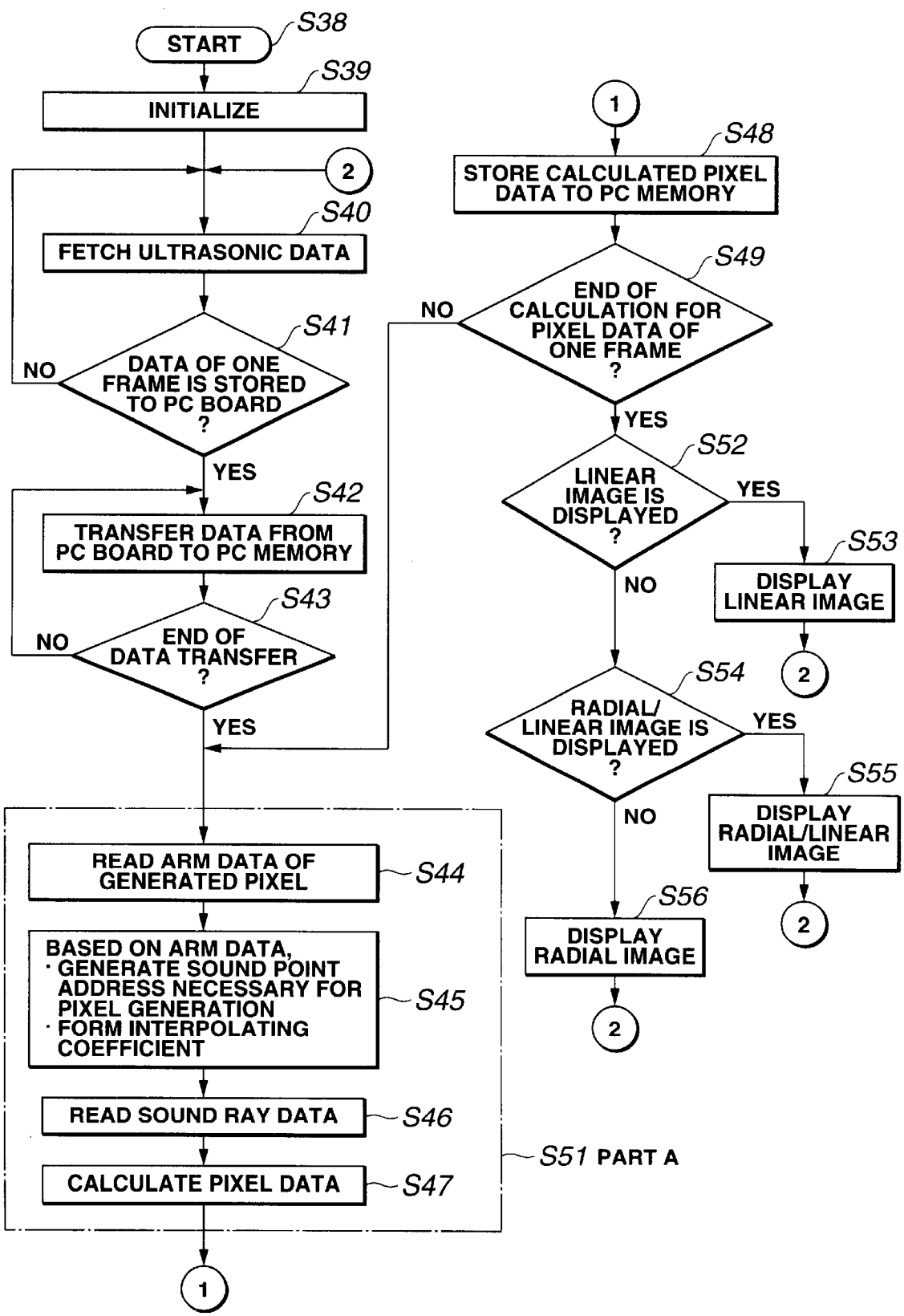
FIG. 12 is a flowchart for explaining a control operation example in the arithmetic processing unit (CPU) when adding a function for displaying an image except for a radial image.

According to the present invention, the data processing step shown in FIG. 11 is changed as shown in FIG. 12 in the construction in which the computer 36 is used, and to thereby enable the addition of the display function except for displaying the radial image. The description now turns to the construction and operation of the above-stated ultrasonic diagnostic apparatus.

The whole construction of the ultrasonic diagnostic apparatus is almost the same as that of the apparatus shown in FIG. 7. The following operations are almost the same as the operations expressed in the flowchart shown in FIG. 11, namely, the ultrasonic wave is transmitted and received by the vibrator 5 and receiving/transmitting unit 34 and stored to the memory 26 for reception data as the reception data digitized by the PC board 35, the data is transferred to the PC internal memory 31 by the DMA transfer, using the PC internal bus controller 29, the transferred data is subjected to the coordinate transformation and interpolating process by the processes in step S51, and the ultrasonic image of one frame is generated.

It is different that as shown in FIG. 12, after generating the ultrasonic image of one frame, the processing routine does not shift to the process (in step S50, refer to FIG. 11) which is displayed by the ultrasonic image data, but shifts to the routine subsequent to step S52 in which a discriminating process for the linear image display.

That is, referring to FIG. 12, the arithmetic processing unit 30 determines whether or not the output mode selected in the process in step S52 displays only the linear image. If YES in step S52, the processing routine advances to step S53, and only the linear image based on the data is displayed. By contrast, if NO in step S52, it is determined whether or not the output mode displays an image obtained the combining of the radial image and the linear image. If it is determined that the output mode displays the image obtained by combining the radial image and the linear image, the processing routine advances to step S55, thereby displaying the image by combining the radial image and the linear image. If it is determined that the output mode does not display by combining the radial image and the linear image, the processing routine advances to step S56, thereby controlling to display only the radial image.

It is to be noted that the discriminating order regarding the display of the radial image and linear image is not limited by that in the processes in steps S52 to S56, and may be controlled so as to be changed.

Figure 15:
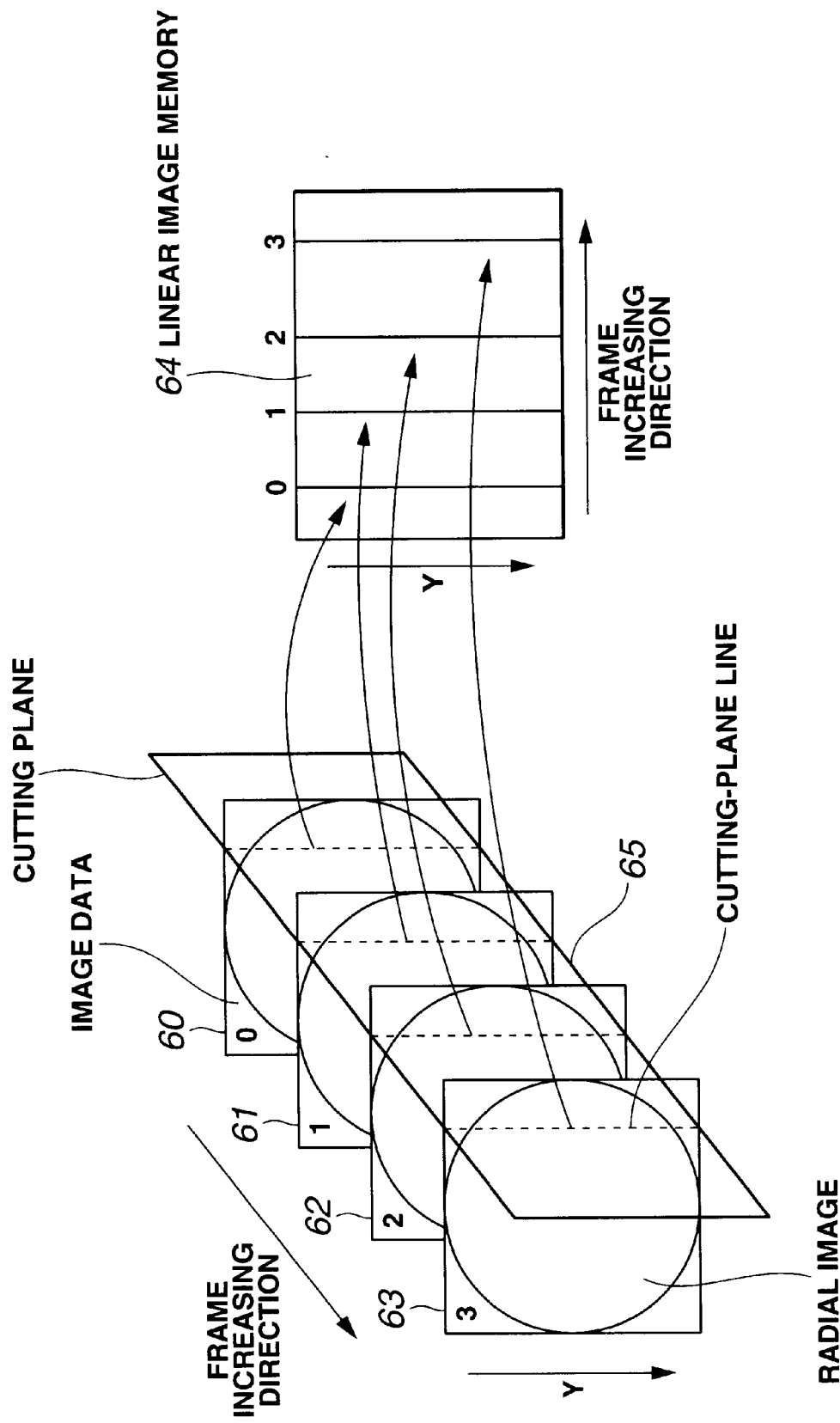
FIG. 15 is an explanatory diagram for explaining a constructing method of a linear image when displaying the linear image based on the process by the arithmetic processing unit.

The further detailed description turns to the method of constructing the linear image included in the processes in steps S53 and S55 with reference to FIG. 15. FIG. 15 is an explanatory diagram for explaining the method of constructing the linear image when displaying the linear image by the process by the arithmetic processing unit.

Referring to FIG. 15, image data 60 to 63 is image data generated by the process in step S51 in FIG. 12. Herein, the explanation relates to a case to store image data of four frames for simple explanation. It is noted that the number of frames can be increased in scope depending on the capacity of the PC internal memory 31 and the processing capacity of the arithmetic processing unit 30, and it is not restricted to this number of frames.

A cutting plane 65 is set to the image data 60 to 63. Image data of a cutting-plane line formed by the intersection of the cutting plane 65 and the image data 60 to 63 is stored to a linear image memory 64 toward the frame increasing direction. The result of storing the image data to the linear image memory 64 becomes the linear image.

So long as a probe having the ultrasonic vibrator is fixed to the position, the linear image can be observed as change in radial image of an arbitrary cutting plane due to the elapse of time. The linear image also can be observed as a cutting-plane image of a moved portion if the probe is moved.

(Effects)

Therefore, according to the present embodiment, the reception data obtained by the reception/transmission is fetched in the PC from the PC board, the program initialized by the computer is used, the arithmetic processing unit executes the coordinate transformation and the interpolating process, and the image is outputted from the image output unit in the PC, thereby enabling the image based on the output mode to be displayed to the monitor. Accordingly, it is possible to construct the ultrasonic diagnostic apparatus without using the dedicated circuit for executing the coordinate transformation and interpolating process, which causes the circuit to be made complicated and large costs, thereby largely contributing to small costs of the ultrasonic diagnostic apparatus.

The arithmetic processing unit conducts the coordinate transformation and interpolating process, the ultrasonic image obtained as a result is stored to the storing device, an arbitrary cutting plane of the ultrasonic image is cut out, the cut-out images are coupled, the coupled image is outputted as a linear image from the image output unit in the computer, thereby enabling the monitor display of the linear image in addition to the radial image. Therefore, it is possible to provide the ultrasonic diagnostic apparatus whose costs are decreased without necessitating a dedicated circuit for generating the linear image which causes the circuit to be made complicated and large costs. Further, since the linear image is generated on software and the simple correspondence is possible by adding a function to the software to generate the radial image, it is possible to add a display function of the ultrasonic image simply and with low costs, thereby largely contributing to the improvement in equipment performance of the ultrasonic diagnostic apparatus.

Third Embodiment (Constitution)

A third embodiment is almost as same as the second embodiment. Therefore, only a different point is described and the same reference numeral denote the same component element and the description is omitted.

Figure 18:
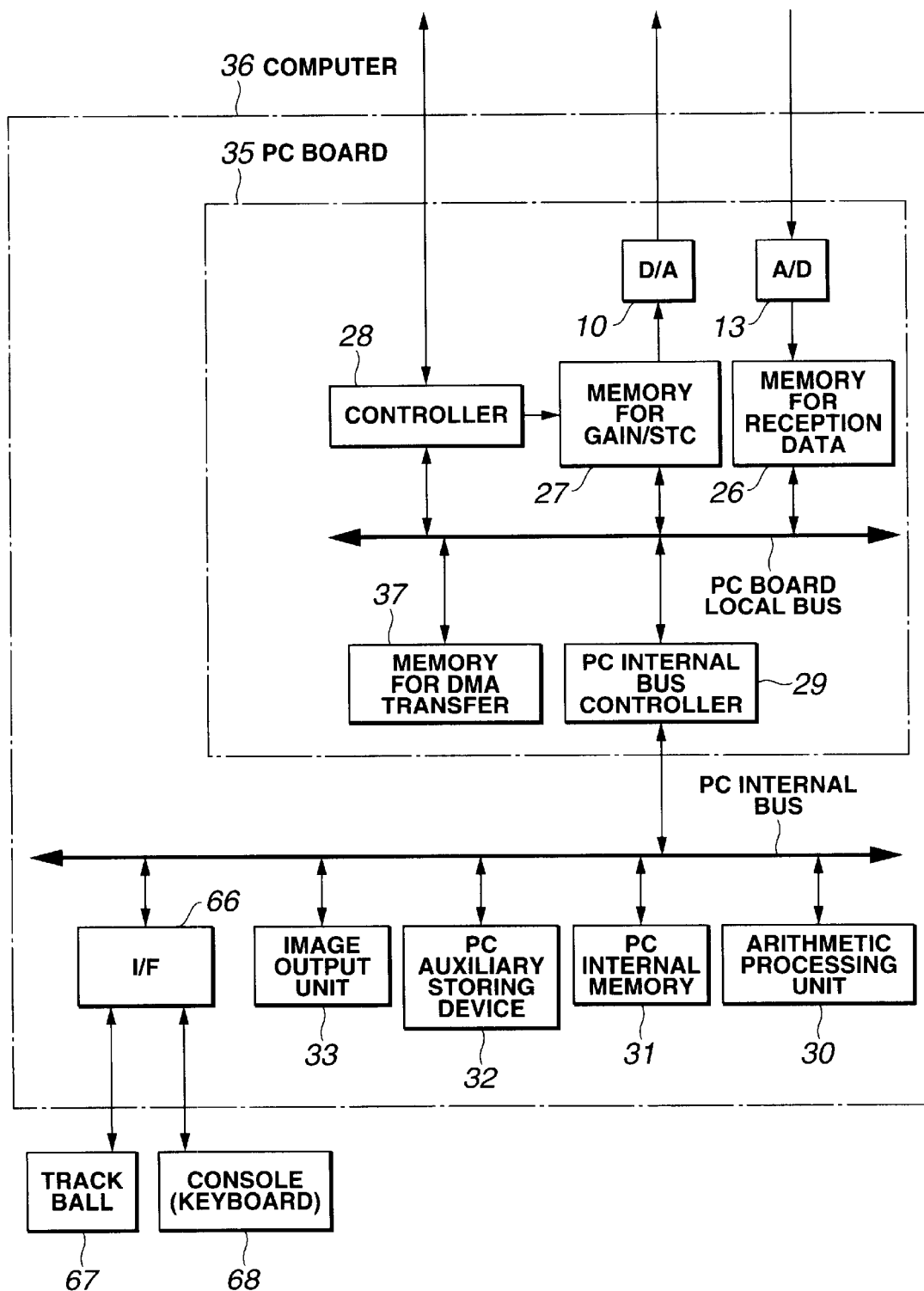
FIG. 18 is a block diagram showing a construction of the ultrasonic diagnostic apparatus of the mechanical scanning system in the computer portion excluding a receiving/transmitting unit.

According to the present embodiment, the whole construction of the ultrasonic diagnostic apparatus is almost as the same as the apparatus of the second embodiment shown in FIG. 7. Differently from the apparatus of the second embodiment, as shown in FIG. 18, the apparatus of the present embodiment is characterized by adding: an interface (referred to as an I/F, hereinafter) 66 which is connected onto the PC internal bus in the computer 36; and a track ball 67 and a console (keyboard) 68 as operating means which is electrically connected to the I/F 66.

The I/F 66 receives an operation instructing signal from the track ball 67 or console 68, and supplies the received operation instructing signal to the arithmetic processing unit 30.

The track ball 67 and console 68 are means necessary for scroll-displaying an image. The usage of the operating means enables the operation instruction signal to be supplied to the arithmetic processing unit 30 via the I/F 66. The arithmetic processing unit 30 recognizes the operation instructing signal and executes the display control based on the operational signal, e.g., scroll display control.

(Operation)

According to the present embodiment, the ultrasonic diagnostic apparatus operates almost similarly to that of the first embodiment. That is, the arithmetic processing unit 30 in the computer 36 performs processes and operates for a series of processes (the processes in step S51) up to the image output shown in the flowchart in FIG. 11, almost similarly to the first embodiment.

In the step of the data processing, when operating the track ball 67 and the console 68 shown in FIG. 18, the arithmetic processing unit 30 determines that the scroll display mode is conducted, and implements a process necessary for scroll display on the basis of the operation instructing signal from the track ball 67 and the console 68. The concept of the scrolling process in this case is discussed with reference to FIGS. 19A to 19C.

Figure 19A:
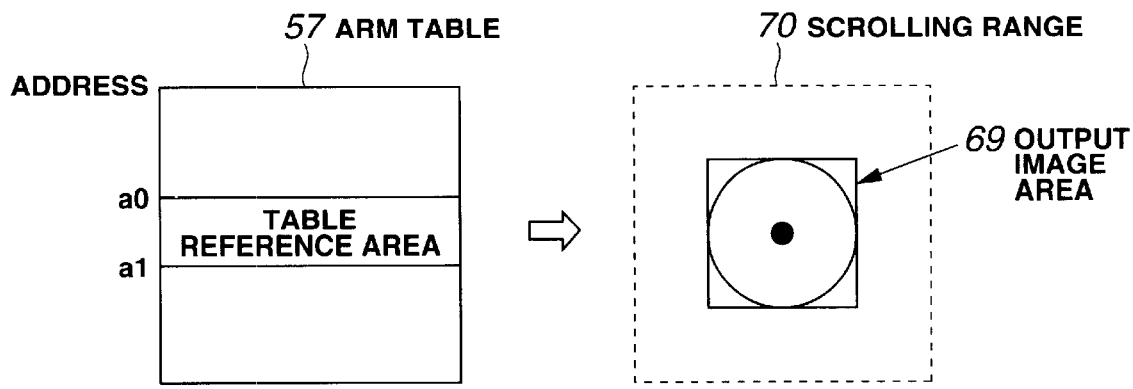
FIG. 19A is a first explanatory diagram for explaining an operation of the apparatus shown in FIG. 18.
Figure 19B:
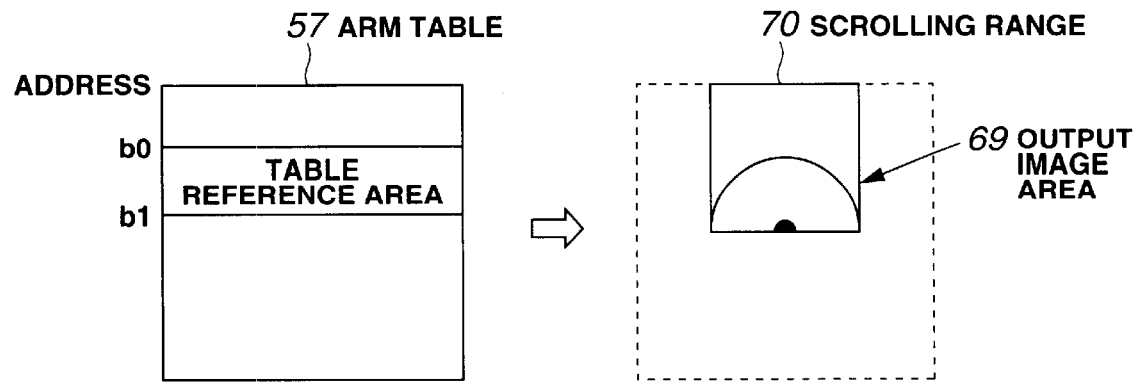
FIG. 19B is a second explanatory diagram for explaining the operation of the apparatus shown in FIG. 18.
Figure 19C:
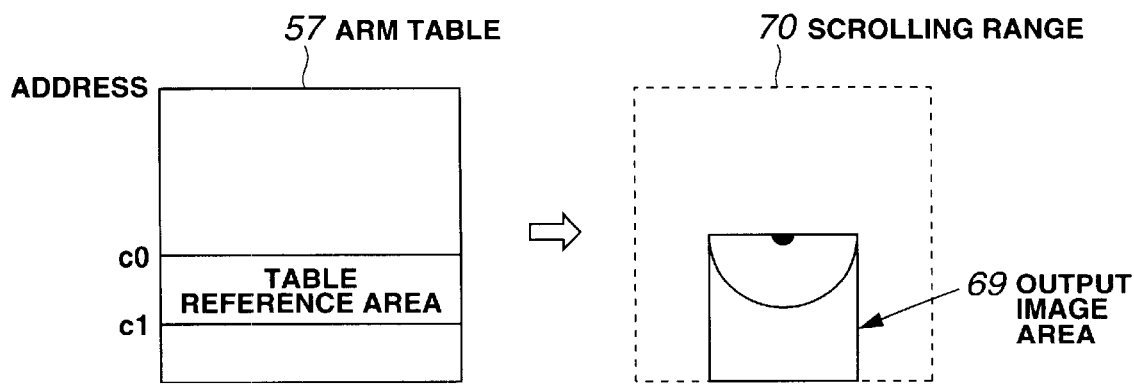
FIG. 19C is a third diagram for explaining an operation of the apparatus shown in FIG. 18.

FIGS. 19A to 19C illustrate output image display in accordance with a state to writing data to the ARM table for explaining the scroll display process: FIG. 19A a state without the scroll display; FIG. 19B a state in which a scrolling range shifts to the upper portion in the picture plane; and FIG. 19C a state in which the scrolling range shifts to the lower portion in the picture plane.

As shown in FIGS. 19A to 19C, stored into the ARM table 57 are the interpolating coefficient for obtaining an arbitrary pixel corresponding to a scrolling range 70 which is over an output image area 69; and the address of the sound ray data memory 58 in which the reception data is stored. Note that it is assumed that the sound ray data memory 58 which has the reception data stores the reception data that is over the output image area 69 as well.

Unless the scroll display is implemented, the arithmetic processing unit 30 refers to a parameter within a range between addresses a0 and a1, and controls to execute the coordinate transformation and the interpolating process in order to generate the ultrasonic image indicated to the output image area 69, as shown in FIG. 19A.

If the user operates the track ball 67 and the console 68 and the operation instructs the arithmetic processing unit 30 to scroll-display the image to the upper side in the picture plane, the arithmetic processing unit 30 shifts the address referred to by the ARM table 57 to a range between addresses b0 and b1, as shown in FIG. 19B, and the operation is controlled by using the parameter within the range of b0 to b1 so as to perform the coordinate transformation and the interpolating process. Accordingly, the output image area 69 shifts to the upper side of the scrolling range 70, as compared with the image display shown in FIG. 19A which is not scroll-displayed, and the outputted ultrasonic image is scrolled and displayed to the upper portion in the picture plane.

If the user operates the track ball 67 and the console 68 and the operation instructs the arithmetic processing unit 30 to scroll-display the image to the lower side in the picture plane, the arithmetic processing unit 30 shifts the address referred to by the ARM table 57 to a range between addresses c0 and c1, as shown in FIG. 19C, and the operation is controlled by using the parameter within the range of c0 to c1 so as to perform the coordinate transformation and the interpolating process. Accordingly, the output image area 69 shifts to the lower side of the scrolling range 70, as compared with the image display shown in FIG. 19A which is not scroll-displayed, and the outputted ultrasonic image is scrolled and displayed to the lower portion in the picture plane.

According to the present embodiment, the arithmetic processing unit 30 can conduct the display process, corresponding to the output modes. Obviously, it is also able to operate the linear image operating process in the same manner as that of the second embodiment.

(Effects)

According to the present embodiment, in addition to obtain the same effects as those of the ultrasonic diagnostic apparatus according to the second embodiment, on the program to generate the ultrasonic image, the arithmetic processing unit executes the program for subjecting only the data of the image output area to the coordinate transformation and the interpolating process from the position instructed by an arbitrary control instructing device and read out from the sound ray data memory in which the reception data more than the display area is stored. Thus, it is possible to scroll-display an image, unnecessitating a dedicated control circuit for implementing the scroll. It is possible to construct the ultrasonic diagnostic apparatus to which the scroll display function is added with a simple construction and low costs, and largely contribute to the improvement in equipment performance.

According to the second and third embodiments, the system comprises: the receiving/transmitting unit 34; and the computer 36 which is electrically connected thereto and has the PC board 35. By storing to the storing means in the PC board 35, the program for executing the process such as the coordinate transformation and the interpolating process in accordance with the image output mode and executing the program by the arithmetic processing unit, the process is performed in accordance with the image output mode. The above program may be stored to another storing means detachable to the computer and the process may be implemented by the use of the storing means.

According to the present invention, it is apparent to construct embodiments different within a wide range on the basis of the present invention without departing the spirit and scope of the present invention. The present invention is not limited by the specific embodiment except for being limited by the appended claims of the present invention.

What is claimed is:

1. An ultrasonic diagnostic apparatus comprising:

a first connecting unit which is detachably mounted to an ultrasonic receiving/transmitting unit having an ultrasonic vibrator to input an ultrasonic reception signal obtained by said ultrasonic receiving/transmitting unit;

a driving control unit for generating a control signal to drive said ultrasonic vibrator;

a second connecting unit which is detachably mounted to said ultrasonic receiving/transmitting unit to output the control signal from said driving control unit to the ultrasonic vibrator of said ultrasonic receiving/transmitting unit;

a first storing unit for storing the ultrasonic reception signal inputted from said first connecting unit as ultrasonic data;

a second storing unit for storing coordinate-transforming program to subject the ultrasonic data stored in said first storing unit to a coordinate-transforming process and generate an ultrasonic image; and an arithmetic processing unit for generating ultrasonic image data which is coordinate-transformed from the ultrasonic data stored in said first storing unit by reading out said coordinate-transforming program from said second storing unit and executing said coordinate-transforming program.

2. An ultrasonic diagnostic apparatus comprising:

an ultrasonic receiving/transmitting unit having an ultrasonic vibrator, and a driving control unit for generating a control signal to drive said ultrasonic vibrator;

an ultrasonic control unit having a first connecting unit which is detachably mounted to the ultrasonic receiving/transmitting unit to input an ultrasonic reception signal obtained by said ultrasonic receiving/transmitting unit and a second connecting unit which is detachably mounted to said ultrasonic receiving/transmitting unit to output the control signal from said driving control unit to the ultrasonic vibrator of said ultrasonic receiving/transmitting unit;

a third connecting unit which is provided for said ultrasonic control unit to input and output a signal from said ultrasonic control unit;

a fourth connecting unit which is detachably mounted to said third connecting unit;

a first storing unit for storing the ultrasonic reception signal inputted from said fourth connecting unit as ultrasonic data;

a second storing unit for storing a coordinate-transforming program to subject the ultrasonic data stored in said first storing unit to a coordinate-transforming process and generate an ultrasonic image; and an arithmetic processing unit for generating ultrasonic image data which is coordinate-transformed from the ultrasonic data stored to said first storing unit by reading out said coordinate-transforming program from said second storing unit and executing said coordinate-transforming program.

3. An ultrasonic diagnostic apparatus comprising:

an ultrasonic receiving/transmitting unit having an ultrasonic vibrator, a driving unit for driving the ultrasonic vibrator, and an ultrasonic receiving unit for receiving an ultrasonic echo signal from said ultrasonic vibrator;

an ultrasonic control unit having a first connecting unit which is detachably mounted to said ultrasonic receiving/transmitting unit to input an ultrasonic reception signal obtained by said ultrasonic receiving/transmitting unit, a driving control unit for generating a drive signal for driving said ultrasonic vibrator, a second connecting unit which is detachably mounted to said ultrasonic receiving/transmitting unit to output the drive signal from said driving control unit to the ultrasonic vibrator of said ultrasonic receiving/transmitting unit, and a third connecting unit for outputting the ultrasonic input signal inputted from said first connecting unit;

a fourth connecting unit which is detachably mounted to said third connecting unit;

a first storing unit for storing the ultrasonic reception signal inputted from said fourth connecting unit as ultrasonic data;

a second storing unit for storing a coordinate-transforming program to subject the ultrasonic data stored to said first storing unit to a coordinate-transforming process and generate an ultrasonic image; and an arithmetic processing unit for generating ultrasonic image data which is coordinate-transformed from the ultrasonic data stored to said first storing unit by reading out said coordinate-transforming program from said second storing unit and executing said coordinate-transforming program.

4. An ultrasonic diagnostic apparatus comprising:

an ultrasonic probe having an ultrasonic vibrator;

a receiving/transmitting unit for transmitting an ultrasonic wave from said ultrasonic vibrator by driving said ultrasonic vibrator, receiving and detecting an obtained echo signal, and outputting an analog reception signal; and a computer for signal-processing said analog reception signal which is outputted from said receiving/transmitting unit, wherein said computer has:

a computer board for converting said analog reception signal outputted from said receiving/transmitting unit into a digital signal, transferring said digital signal to a computer internal bus as reception data, and controlling said receiving/transmitting unit;

a storage unit for storing said reception data transferred from said computer board to said computer internal bus and also storing a coordinate-transforming program to subject said reception data to a coordinate-transforming process and generate an ultrasonic image; and an arithmetic processing unit for reading out said coordinate-transforming program from said storing unit and executing said coordinate-transforming program, thereby to generate an ultrasonic image which is coordinate-transformed from said reception data stored to said storing unit.

5. An apparatus according to claim 4, wherein said computer board comprises:

an A/D converter for converting the reception signal of said analog signal into the digital signal;

a memory for storing the reception data which is digitally converted by said A/D converter;

a data width controller for controlling a plurality of pieces of the reception data stored in said memory to be arranged by having a data bus width of said computer internal bus; and said computer internal bus controller for transferring said plurality of pieces of the reception data stored in said memory to said computer internal bus once by said data width controller.

6. An apparatus according to claim 4, wherein said computer board comprises:

a controller for controlling said receiving/transmitting unit and controlling a circuit on the computer board;

a wiring data memory for storing wiring data of said controller; and a computer internal bus controller for controlling access among said controller, said wiring data memory, and said computer internal bus.

7. An apparatus according to claim 4, wherein said computer generates the ultrasonic image by the data transferred from said computer board, wherein, said storing unit further stores a second program to cut out the ultrasonic images of a plurality of frames at a common arbitrary position, couple segmented ultrasonic images which are obtained, and output the images as an ultrasonic tomogram, and said arithmetic processing unit further generates the ultrasonic image and the ultrasonic tomogram by executing said program.

8. An apparatus according to claim 4, further comprising an input device for inputting instructional data, wherein said storing unit further stores a second program to change a read-out position of data on a display area of the ultrasonic image transferred from said computer board in accordance with an instruction of said input device and generate the ultrasonic image by performing the coordinate-transforming process, and said arithmetic processing unit further executes said second program.

9. An apparatus according to claim 4, wherein said storing unit further stores a second program to set an address of the reception data necessary for generating an arbitrary pixel of the ultrasonic image and an interpolating coefficient necessary for obtaining an arbitrary pixel by performing an interpolating process on the basis of the reception data to one item of reference data, and generate the ultrasonic image by performing the coordinate transformation and the interpolating process on the basis of the reception data by the use of the reference data, and said arithmetic processing unit further executes said second program.

10. An apparatus according to claim 4, further comprising:

a driving unit for driving said ultrasonic vibrator mechanically;

an output unit for outputting a position signal indicative of a position of the vibrator the position of which is shifted by said driving unit; and a controller mounted to said computer board which generates a timing signal to the receiving/transmitting unit on the basis of said position signal and has a changeable function responsive to the first program for causing the timing signal to correspond to a period of the position signal.

* * * * *